United States Patent
Johnson et al.

(10) Patent No.: US 10,929,324 B2
(45) Date of Patent: Feb. 23, 2021

(54) SYSTEMS AND METHODS FOR COMMUNICATION AND/OR CONTROL OF SCALABLE, MODULAR NETWORK NODES

(71) Applicant: Schneider Electric Systems USA, Inc., Foxboro, MA (US)

(72) Inventors: Alexander Park Johnson, Houston, TX (US); Michael Fox, Brighton (GB); Michael Ian Baines, Littlehampton (GB); Mark William Green, Worthing (GB); Richard Linwood Linscott, Plainville, MA (US)

(73) Assignee: Schneider Electric Systems USA, Inc., Foxboro (MA)

( * ) Notice: Subject to any disclaimer, the term of this patent is extended or adjusted under 35 U.S.C. 154(b) by 0 days.

(21) Appl. No.: 16/461,277

(22) PCT Filed: Oct. 9, 2017

(86) PCT No.: PCT/US2017/055765
§ 371 (c)(1),
(2) Date: May 15, 2019

(87) PCT Pub. No.: WO2018/068040
PCT Pub. Date: Apr. 12, 2018

(65) Prior Publication Data
US 2019/0347231 A1 Nov. 14, 2019

Related U.S. Application Data

(60) Provisional application No. 62/434,107, filed on Dec. 14, 2016, provisional application No. 62/405,734, filed on Oct. 7, 2016.

(51) Int. Cl.
*G05B 19/418* (2006.01)
*H04L 12/935* (2013.01)
(Continued)

(52) U.S. Cl.
CPC ... *G06F 13/4004* (2013.01); *G05B 19/41855* (2013.01); *H04L 49/3054* (2013.01); *H04L 67/12* (2013.01); *G05B 2219/33273* (2013.01)

(58) Field of Classification Search
CPC . G06F 13/4004; H04L 67/12; H04L 49/3054; G05B 19/41855; G05B 2219/33273
See application file for complete search history.

(56) References Cited

U.S. PATENT DOCUMENTS

| | | | | |
|---|---|---|---|---|
| 5,146,401 A | * | 9/1992 | Bansal | G05B 19/0421 700/9 |
| 6,445,963 B1 | * | 9/2002 | Blevins | G05B 11/32 700/19 |

(Continued)

FOREIGN PATENT DOCUMENTS

WO  WO2015/174971  11/2015

OTHER PUBLICATIONS

PCT Search Report for International Patent Application No. PCT/US2017/055765 dated Feb. 1, 2018, 2 pages.

(Continued)

*Primary Examiner* — Idriss N Alrobaye
*Assistant Examiner* — Ronald T Modo
(74) *Attorney, Agent, or Firm* — Locke Lord LLP

(57) ABSTRACT

Methods and Systems are described for control at/of a network node. The network node can include a control module and first and second modules coupled to the control module. The first module can be configured to select first input/output (I/O) types of a field device coupled at an I/O interface of the network node. The second module can be configured to select a second I/O types of the field device. The first and second modules can be coupled to the I/O interface through a field device coupler.

11 Claims, 12 Drawing Sheets

(51) Int. Cl.
*H04L 29/08* (2006.01)
*G06F 13/40* (2006.01)

(56) References Cited

U.S. PATENT DOCUMENTS

| | | | |
|---|---|---|---|
| 2002/0152306 A1* | 10/2002 | Tuck, III | H04L 12/5602 |
| | | | 709/224 |
| 2002/0183864 A1 | 12/2002 | Apel et al. | |
| 2003/0212530 A1 | 11/2003 | Bibelhausen et al. | |
| 2008/0126665 A1* | 5/2008 | Burr | G05B 19/042 |
| | | | 710/316 |
| 2010/0149997 A1 | 6/2010 | Law et al. | |
| 2012/0294156 A1 | 11/2012 | Hack et al. | |
| 2013/0173832 A1 | 7/2013 | Calvin et al. | |
| 2016/0232121 A1* | 8/2016 | Castiel | G06F 13/4022 |

OTHER PUBLICATIONS

Written Opinion of the International Searching Authority for International Patent Application No. PCT/US2017/055765 dated Feb. 1, 2018, 7 pages.
Partial Supplementary European Search Report for European Patent Application No. 17859312.5 dated May 15, 2020, 15 pages.

\* cited by examiner

SYSTEMS AND METHODS FOR COMMUNICATION AND/OR CONTROL OF SCALABLE, MODULAR NETWORK NODES

CROSS-REFERENCE TO RELATED APPLICATIONS

This application claims priority to and benefit from U.S. Provisional Application No. 62/405,734, filed Oct. 7, 2016, and U.S. Provisional Application No. 62/434,107, filed Dec. 14, 2016, which are each hereby incorporated by reference in their entirety.

TECHNICAL FIELD

The present disclosure is generally directed to distributed control models for industrial process control. More particularly, aspects of the present disclosure relate to systems and methods for distributed process control of scalable, modular network nodes that form a portion of an industrial process control system.

INTRODUCTION

In today's Distributed Control Systems (DCS'), large-capacity control nodes are often configured to execute a significant collection of control loops. Common control implementations include executing control at fixed periods (e.g., a length or portion of time, interval, etc.) and/or sets of periods. For example, some control nodes may include a single fixed period for control execution, while other, more flexible control nodes may enable multiple, fixed periods (e.g., configured to run in parallel) for control execution. Control theory suggests that sampling periods for control execution are (or should be) related to process control time-constants. But, because different control processes can vary greatly during/for a precise process control time-constant, fixed period control is not perfectly aligned to the control loops that are being controlled. Moreover, large-capacity control nodes often consume a high-percentage of different control cycles of DCS' due, in part, to the many control function blocks and/or control loops being executed at the control node. Further, to maximize the cost effectiveness of large-capacity control nodes, the control nodes are generally filled to near capacity. Because of this, the control nodes often complete execution of all control function blocks and/or control loops before sending control outputs to coupled input/output (I/O) modules and/or field devices. In other words, control nodes often delay sending control outputs to coupled I/O modules and/or field devices until near an end of the control cycle. This reduces the elapsed time from, for example, a control output being sent to the coupled I/O module and/or field device and receipt of a related process measurement in a subsequent control cycle. Consequently, control quality in DCS' may be reduced compared to other control models where control outputs are sent earlier in the control cycle. It is, therefore, desirable to implement a new control model configured such that an end-user can tune, for example, the fixed period control to precisely align with the control loops that are being controlled (e.g., the fixed period control aligns with the precise time-constant). Further, it is desirable that the new control model improves process control by sending control outputs to coupled I/O modules and/or field devices earlier in the control cycle.

SUMMARY

The present disclosure solves one or more of the above-mentioned problems and/or demonstrates one or more of the above-mentioned desirable features. Other features and/or advantages may become apparent from the description that follows.

In accordance with at least one exemplary embodiment, the present disclosure contemplates a modular network node. The modular network node may include a control module and a first and second module coupled to the control module. The first module can be configured to select a first input/output (I/O) type of a field device coupled at an input/output (I/O) interface of the modular network node. The second module can be configured to select a second I/O type of the field device. The first and second modules may be coupled to the I/O interface through a first field device coupler.

In accordance with another exemplary embodiment, the present disclosure contemplates a control system including a control node and a Single Signal Input/Output (SSIO) module. The SSIO module can be coupled to the control node and configured to: collect a first set of inputs from a coupled field device for a first duration; monitor the collected first set of inputs for a fault condition; collect a second set of inputs for a second duration on detection of a fault condition; and, identify an abnormal condition using the collected first set of inputs and the collected second set of inputs.

In accordance with at least another exemplary embodiment, the present disclosure contemplates a control system including a master time-strobe module hosted at a network node and an SSIO/Universal Input/Output (UIO) module. The SSIO/UIO module can include a control module and a first module coupled at the control module. The first module can be configured to: query the control module for control information; and, select an I/O type of a coupled field device using the queried control information. The master time-strobe module can be configured to: receive time updates from an external source; and, send a first message to the control module instructing the SSIO/UIO module to synchronize a current time using the time updates.

Additional objects and advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

BRIEF DESCRIPTION OF THE DRAWINGS

The present disclosure can be understood from the following detailed description either alone or together with the accompanying drawings. The drawings are included to provide a further understanding of the present disclosure, and are incorporated in and constitute a part of this specification. The drawings, which are incorporated in and constitute a part of this specification, illustrate one or more embodiments of the present disclosure and, together with the description, explain certain principles and operation. In the drawings.

DETAILED DESCRIPTION

This description and the accompanying drawings illustrate exemplary embodiments and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in the specification and the appended claims, the singular forms "a," "an," and "the," and any singular use of any word, include plural referents unless expressly and unequivocally limited to one referent. As used herein, the term "include" and its grammatical variants are intended to be non-limiting, such that recitations of items in a list is not to the exclusion of other like items that can be substituted or added to the listed items.

Figure 1A:
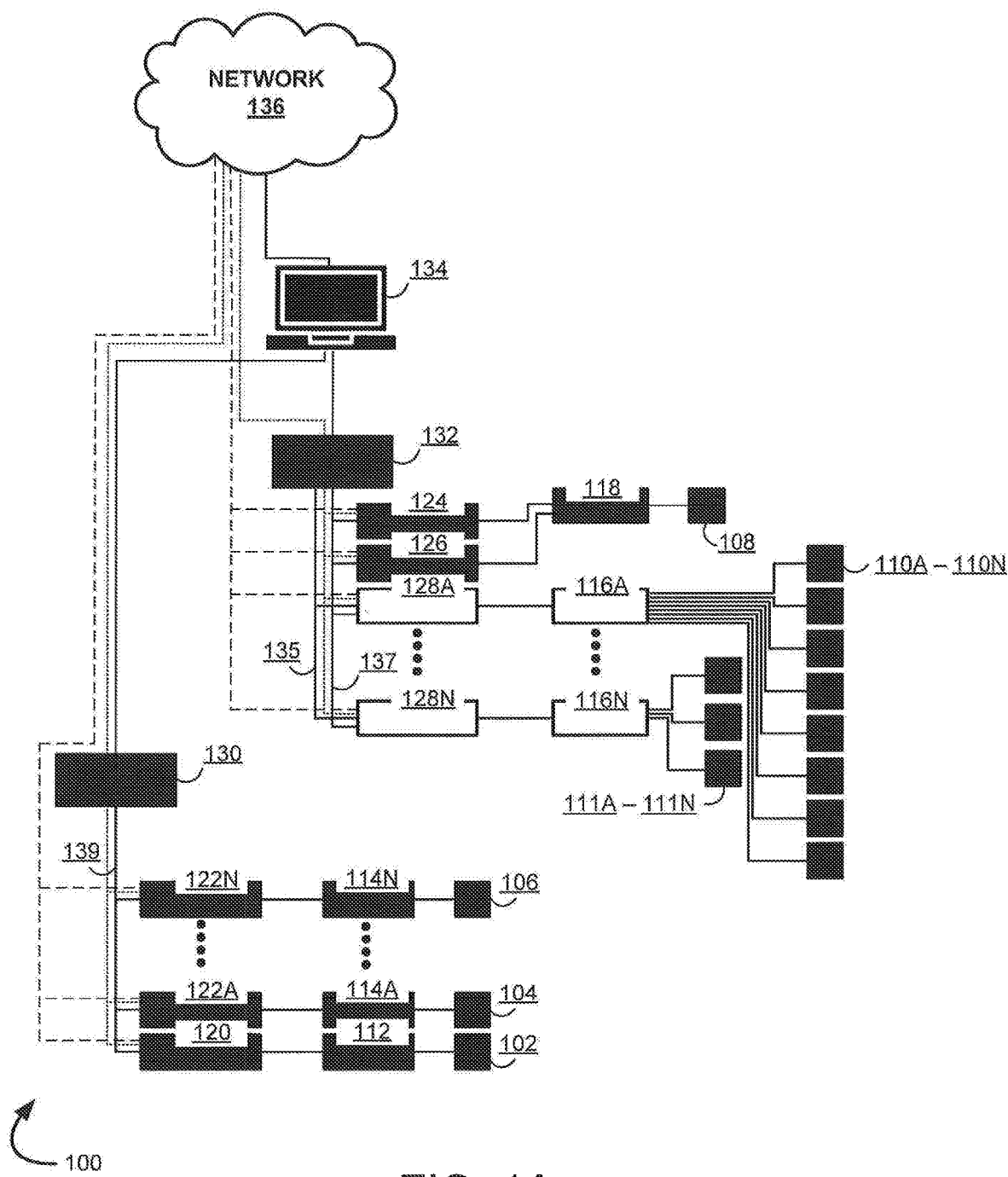
FIG. 1A is a schematic view of an exemplary process control system configured to implement a scalable, modular control architecture in accordance with an exemplary embodiment of the present disclosure.

With reference now to FIG. 1A, a schematic view of an exemplary process control system 100 is depicted. System 100 can include field devices 102, 104, 106, 108, 110A-110N, 111A-111N (e.g., temperature, flow, level and pressure transmitters, valves, actuators, and/or other intelligent process equipment, etc.) communicatively coupled to control nodes 130, 132, network node 134, and/or network 136 through input/output (I/O) modules 120, 122A-122N, 124, 126, 128A-128N using, for example, separate communication buses (e.g., a wire, a cable, a circuit, an optical fiber, a wireless signal, a network protocol, etc.). The communication buses connect the field devices 102, 104, 106, 110A-110N, 111A-111N, 108 to respective I/O modules 120, 122A-122N, 124, 126, 128A-128N via field device couplers 112, 114A-114N, 116A-116N, 118.

Network 136 can be a wired and/or wireless communication network that uses, for example, physical and/or wireless data links to carry network data among (or between) various network nodes such as, for example, field devices 102, 104, 106, 108, 110A-110N, 111A-111N, I/O modules 120, 122A-122N, 124, 126, 128A-128N, control nodes 130, 132, and/or network node 134. Network 136 can include a Local Area Network (LAN), a Wide Area Network (WAN), and an internetwork (including the Internet). Network 136 can support push-to-talk (PTT), broadcast video, and/or data communications by field devices 102, 104, 106, 108, 110A-110N, 111A-111N, I/O modules 120, 122A-122N, 124, 126, 128A-128N, control nodes 130, 132, and/or network node 134. Wireless network protocols can include, for example, MODBUS, Serial, IP, OPC UA, OPC DA, SCADA, Ethernet/IP, IEC 61850, Multimedia Broadcast Multicast Service (MBMS), Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Long Term Evolution (3GPP LTE), Worldwide Interoperability for Microwave Access (WiMAX), etc. Wired network physical layers and/or wired network protocols can include, for example, MODBUS, Serial, IP, OPC UA, OPC DA, SCADA, IEC 61850, IEC 61131, IEC 61499, Ethernet, Fast Ethernet, Gigabit Ethernet, Ethernet/IP, Local Talk (such as Carrier Sense Multiple Access with Collision Avoidance), Token Ring, Fiber Distributed Data Interface (FDDI), and Asynchronous Transfer Mode (ATM), etc.

Network node 134 can be a standalone computing device, computing system, or network component that uses, for example, physical and/or wireless data links to carry network data among (or between) various network nodes such as, for example, field devices 102, 104, 106, 108, 110A-110N, 111A-111N, I/O modules 120, 122A-122N, 124, 126, 128A-128N, control nodes 130, 132, and/or network 136.

Further, the network nodes and/or an end-user (not shown) can access network node 134 and/or network data (e.g., stored at a central datastore hosted at and/or distributed among the network nodes, network node 134, network 136, and/or at other external networks) to control operations (e.g., implement simple feedback loops, cascade loops, feedforward, nonlinear, and/or complex characterization control strategies using algorithms and/or I/O modules 120, 122A-122N, 124, 126, 128A-128N), management functions (e.g., optimization, data acquisition, alarm detection, notification, regulatory, logic, timing, and sequential control together with, for example, I/O modules 120, 122A-122N, 124, 126, 128A-128N), and/or maintenance functions of system 100. For example, the network nodes and/or an end-user can access (e.g., using peer-to-peer, central, and/or distributed datastores, etc.) network data stored at and/or distributed among the network nodes, network node 134, network 136, and/or at other external networks to: change variable values, change process control functions, automate control of field devices 102, 104, 106, 108, 110A-110N, 111A-111N to execute process control strategies, etc. Network node 134 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. Other network nodes or elements can be used to facilitate communication between, for example, network node 134 and network 136, which are omitted for clarity, including additional processing nodes, routers, gateways, and physical and/or wireless data links for carrying data among the various network nodes.

Control nodes 130, 132 can be distributed, optionally highly available (e.g., fault-tolerant, redundant, M:N redundancy, etc.) and/or field/rack-room mounted network nodes configured to provide communication, control operations, management functions, and/or maintenance functions for system 100. Control nodes 130, 132 can be configured as single and/or multiple control modules configured to perform varying operations and/or functions. Further, control nodes 130, 132 can enable a self-hosting mode that facilitates, for example, a self-boot (e.g., with a valid control database) at the control node 130, 132 even when network node 134 and/or network 136 is off-line. To improve availability, control nodes 130, 132 can implement high-availability schemes such as, for example, a fault-tolerant or other configuration (e.g., redundant, M:N redundancy, etc.). In the fault-tolerant configuration, for example, control nodes 130, 132 can include multiple control modules configured to operate in parallel. Together, the multiple control modules can form a fault-tolerant pair. In the event of a hardware failure at one of the fault-tolerant pair of control modules, the control node 130, 132 can continue to operate. Further, each of the fault-tolerant pair of control modules can detect faults (e.g., due to an ability to simultaneously receive/process information) and, on fault detection, can perform diagnostics to determine which control module of the fault-tolerant pair of control modules is defective. The non-defective control module of the fault-tolerant pair can assume control (e.g., from the defective control module) without affecting normal system operations. In another exemplary embodiment, control nodes 130, 132 can be configured to support time-synchronization at, for example, a time-strobe and/or other time-synch control module (not shown). Control nodes 130, 132 can receive and/or output time updates. For example, control nodes 130, 132 can receive time updates directly using either an externally maintained optional source of Universal Coordinated Time (UTC) from GPS satellites (or other eternal, user-selected source) or an internal source using configured software. Alternatively, control nodes 130, 132 can receive time-strobe signals (or pulses) from network node 134 and/or network 136 instructing the control nodes 130, 132 to synchronize a current time to the updated time. The control nodes 130, 132 can output time-strobe signals (or pulses) to each other, I/O modules 120, 122A-122N, 124, 126, 128A-128N, and/or field devices 102, 104, 106, 108, 110A-110N, 111A-111N instructing the other control nodes 130, 132, I/O modules 120, 122A-122N, 124, 126, 128A-128N, and/or field devices 102, 104, 106, 108, 110A-110N, 111A-111N to synchronize a current time to the updated time. The time-synch control module, in addition to GPS, can receive, output, read, and/or write data types, signal types, network physical layers, and/or network protocols that include, for example: Precision Time Protocol (PTP), IEEE 1588, NTP, SNTP, etc.

As noted above, field devices 102, 104, 106, 108, 110A-110N, 111A-111N can be communicatively coupled to control nodes 130, 132, network node 134, and/or network 136 directly and/or through I/O modules 120, 122A-122N, 124, 126, 128A-128N. Field devices 102, 104, 106, 108, 110A-110N, 111A-111N can be configured to exhibit a high-level of fault-recovery and, when subject to high-level safety and/or other requirements, can include highly available (e.g., fault-tolerant, redundant, M:N redundancy, etc.) configurations. Further, field devices 102, 104, 106, 108, 110A-110N, 111A-111N can be configured to capture and/or output data (e.g., pressure, temperature, flow, level, liquid analytical, valve positioner high-performance measurements, etc.) at fixed intervals (e.g., a length or portion of time, period, etc.) from/to, for example, sensors networked or embedded at intelligent or other assets (e.g., distillation column, tank, pump, heat exchanger, etc.) deployed within a process control environment (not shown). Captured data can be forwarded (or relayed) from the field devices 102, 104, 106, 108, 110A-110N, 111A-111N to I/O modules 120, 122A-122N, 124, 126, 128A-128N via field device couplers 112, 114A-114N, 116A-116N, 118 using communication buses. The I/O modules 120, 122A-122N, 124, 128, 128A-128N can be configured to receive, output, read, and/or write different data types, signal types, and/or network protocols. For example, I/O modules 120, 122A-122N, 124, 126, 128A-128N can receive and/or output data and/or signals that include: analog in/out (AI/AO) signals, discrete in/out (DI/DO) signals, digital in/out signals, 4-20 Ma in/out+ HART signals, HART in/out signals, FOXCOM in/out signals, pulse signals, NAMUR signals, T/C signals, RTD signals, optical networking signals, etc. I/O modules 120, 122A-122N, 124, 126, 128A-128N can further read and/or write wireless/wired network physical layers and/or wireless/wired network protocols that include: MODBUS, Serial, IP, OPC UA, OPC DA, SCADA, IEC 61850, MBMS, CDMA 1×RTT, GSM, UMTS, HSPA, EV-DO, EV-DO rev. A, 3GPP LTE, WiMAX, Ethernet, Fast Ethernet, Gigabit Ethernet, Ethernet/IP, Local Talk, Token Ring, FDDI, ATM, etc.

In one exemplary embodiment, field devices 110A-110N, 111A-111N can be communicatively coupled to I/O modules 128A-128N via field device couplers 116A-116N in point-to-point and/or multi-drop configurations. In both configurations, the field device couplers 116A-116N and/or I/O modules 128A-128N can be pre-configured to receive, output, read, and/or write specific data types, signal types, and/or network protocols. In a point-to-point configuration, each field device 110A-110N, 111A-111N receives and/or outputs captured or other data over a dedicated communication bus (e.g., eight field devices can be connected to a single device coupler and/or I/O module, as shown in FIG. 1A) to pre-configured field device couplers 116A-116N and/or I/O modules 128A-128N. Due to the configuration of field device couplers 116A-116N and/or I/O modules 128A-128N, if, for example, a fault occurs at a single I/O interface (not shown) of the field device coupler 116A-116N and/or I/O module 128A-128N, the entire field device coupler 116A-116N and/or I/O module 128A-128N may need to be replaced. In other words, field device couplers 116A-116N and/or I/O modules 128A-128N have a high-scope of failure (e.g., if a fault occurs at a single I/O interface and/or the field device coupler 116A-116N or I/O module 128A-128N fails, any coupled field device 110A-110N goes off-line), potentially adversely affecting normal system operations. Consequently, field device couplers 116A-116N and/or I/O modules 128A-128N are typically configured as redundant (e.g. fault-tolerant pairs) field device couplers 116A-116N and/or I/O modules 128A-128N that operate in parallel. If one field device coupler 116A-116N and/or I/O module 128A-128N of the fault-tolerant pair is defective (or fails), the non-defective field device coupler 116A-116N and/or I/O module 128A-128N of the fault-tolerant pair can assume control (e.g., from the defective or failed field device coupler 116A-116N and/or I/O module 128A-128N). Alternatively, when the process control system 100 requires a new field device 110A-110N, 111A-111N to be added, if, for example, existing field device couplers 116A-116N and/or I/O modules 128A-128N are at full-capacity and/or an I/O interface of field device couplers 116A-116N and/or I/O modules 128A-128N is not pre-configured to receive, output, read, and/or write the specific data type, signal type, and/or network protocol of the newly added field device 110A-110N, 111A-111N, then a new field device coupler 116A-116N and/or I/O module 128A-128N must be added. Because field device couplers 116A-116N and/or I/O modules 128A-128N typically support eight, sixteen, and/or thirty-two field devices 110A-110N, 111A-111N, if a new field device coupler 116A-116N and/or I/O module 128A-128N must be added, the cost-effectiveness of the field device couplers 116A-116N and/or I/O modules 128A-128N may be reduced.

In a multi-drop configuration, field devices 110A-110N, 111A-111N receive and/or output captured or other data over a single, dedicated communication bus (or a wireless network) to pre-configured (e.g., built to select and/or receive, output, read, and/or write a particular data type, signal type, and/or network protocol) field device couplers 116A-116N and/or I/O modules 128A-128N. Due to the configuration of field device couplers 116A-116N and/or I/O modules 128A-128N, each field device coupler 116A-116N and/or I/O modules 128A-128N can only receive, output, read, and/or write a single, specific data type, signal type, and/or network protocol. For example, field device coupler 116A and/or I/O module 128A can be configured to receive and/or output AI/AO signals. Thus, only field devices 110A-110N configured to output captured and/or other data using AI/AO signals can be communicatively coupled to field device coupler 116A and/or I/O module 128A. Similarly, field device coupler 116N and/or I/O module 128N can be configured to receive and/or output DI/DO signals. Thus, only field devices 111A-111N configured to output captured and/or other data using DI/DO signals can be communicatively coupled to field device coupler 116N and/or I/O module 128N. In other words, field devices 110A-110N configured to output captured and/or other data using AI/AO signals could not be communicatively coupled to field device coupler 116N and/or I/O module 128N, which are configured to receive and/or output DI/DO signals. I/O modules 128A-128N and/or field device couplers 116A-116N (e.g., configured to support field devices 110A-110N, 111A-111N) can be communicatively coupled to control nodes 130, 132, network node 134, and/or network 136 via an I/O communication bus 135. The I/O communication bus 135 can configured to execute, for example, an RS-485 serial protocol and/or can execute any other network protocol.

In another exemplary embodiment, field devices 102, 104, 106, 108 can be communicatively coupled to I/O modules 120, 122A-122N, 124, 126 via field device couplers 112, 114A-114N, 118 in a point-to-point and/or networked configuration. In both a point-to-point configuration and networked configuration, field device couplers 112, 114A-114N, 118 and/or I/O modules 120, 122A-122N, 124, 126 can be pre-configured (e.g., built to select and/or receive, output, read, and/or write any data type, signal type, and/or network protocol) field device couplers 112, 114A-114N, 118 and/or I/O modules 120, 122A-122N, 124, 126. In a point-to-point configuration, each field device 102, 104, 106, 108 receives and/or outputs captured or other data over a single, dedicated communication bus to pre-configured field device couplers 112, 114A-114N, 118 and/or I/O modules 120, 122A-122N, 124, 126. Alternatively, in a networked configuration, I/O modules 120, 122A-122N, 124, 126 can select and/or receive, output, read, and/or write any data types, signal types, and/or network protocols at/to multiple field devices 102, 104, 106, 108 communicatively coupled to the I/O modules 120, 122A-122N, 124, 128 at an I/O interface via a field device switch network (e.g., in a chicken foot, daisy-chain, and/or other configuration, etc.). Due to the configuration of field device couplers 112, 114A-114N, 118 and/or I/O modules 120, 122A-122N, 124, 126, if, for example, a fault occurs at an I/O interface (not shown) of field device couplers 112, 114A-114N, 118 and/or I/O modules 120, 122A-122N, 124, 126, the scope of failure is relatively low (e.g., if a fault occurs at the I/O interface and/or the field device coupler 112, 114A-114N, 118 and/or I/O module 120, 122A-122N, 124, 126 fails, only a single field device goes offline). Although not desirable, field device couplers 112, 114A-114N, 118 and/or I/O modules 120, 122A-122N, 124, 126 can be configured as redundant (e.g., fault-tolerant pairs) field device couplers 112, 114A-114N, 118 and/or I/O modules 120, 122A-122N, 124, 126 that operate in parallel. Alternatively, when the process control system 100 requires a new field device 102, 104, 106, 108 to be added, any single field device coupler 112, 114A-114N, 118 and/or I/O module 120, 122A-122N, 124, 126 can be added. Thus, a fault-condition and/or failure at field device couplers 112, 114A-114N, 118 and/or I/O modules 120, 122A-122N, 124, 126 minimally affects normal system operations and, while field device couplers 112, 114A-114N, 118 and/or I/O modules 120, 122A-122N, 124, 126 can be configured in fault-tolerant pairs, it is not necessary. Thus, the cost-effectiveness of field device couplers 112, 114A-114N, 118 and/or I/O modules 120, 122A-122N, 124, 126 may be increased. I/O modules 120, 122A-122N, 124, 126 and/or field device couplers 112, 114A-114N, 118 (e.g., configured to support a single field device 102, 104, 106, 108) can be communicatively coupled to control nodes 130, 132, network node 134, and/or network 136 via an I/O communication bus 137, 139. The I/O communication bus 137, 139 can be configured to execute, for example, an Ethernet, Fast Ethernet, Gigabit Ethernet, Ethernet/IP or any other wired/wireless physical layer and/or network protocol.

Figure 1B:
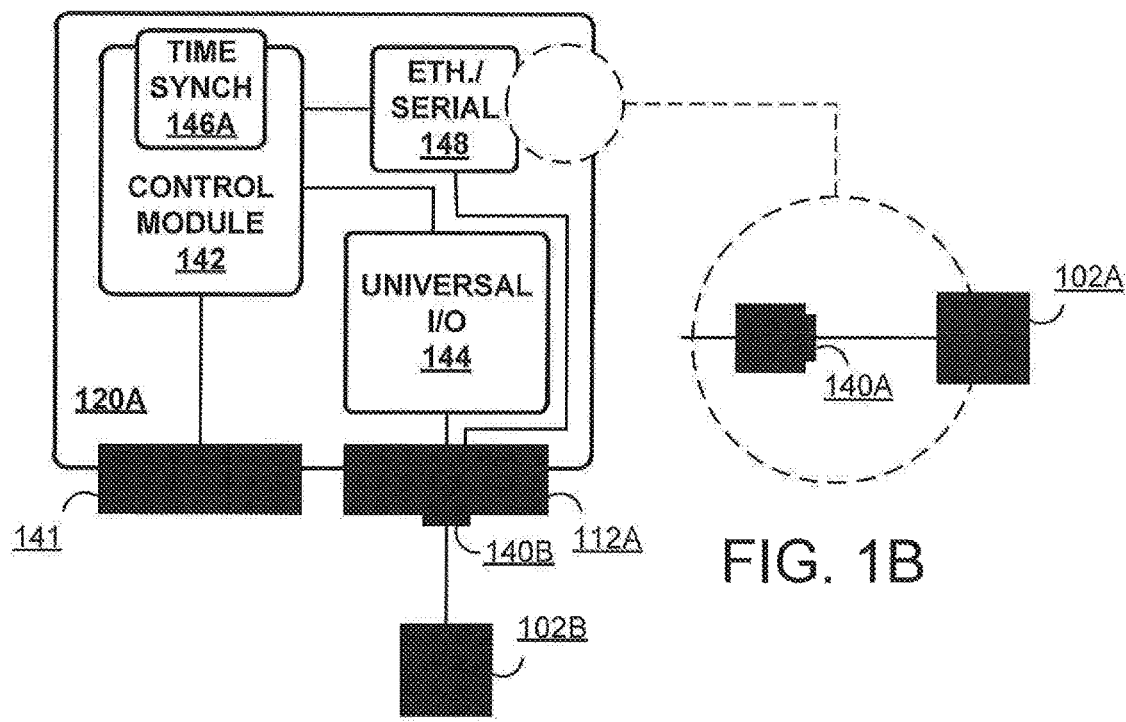
FIG. 1B is a schematic diagram that shows a plan view of a scalable, modular input/output (I/O) module of the exemplary process control system of FIG. 1A in accordance with an exemplary embodiment of the present disclosure.
Figure 1C:
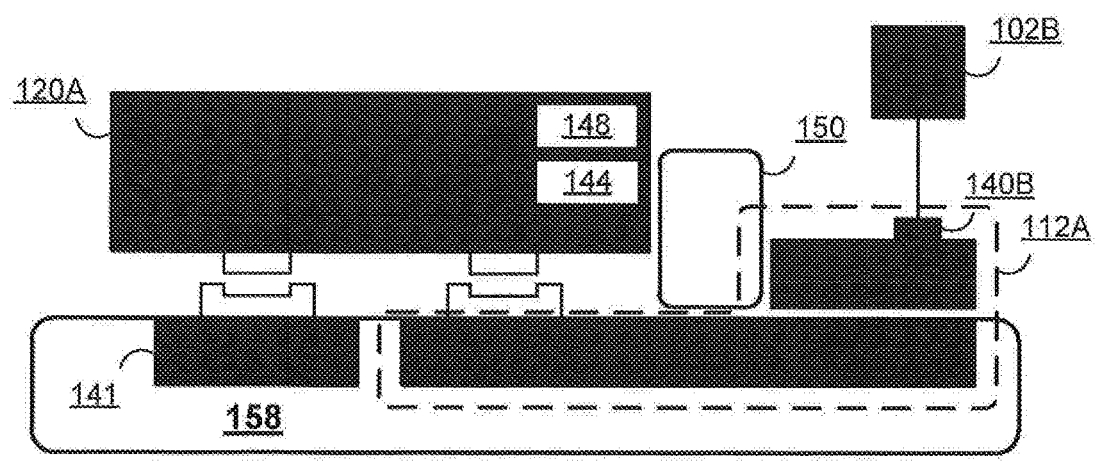
FIG. 1C is a schematic diagram that shows a section view of the scalable, modular I/O module of FIG. 1B being coupled at a baseplate in accordance with an exemplary embodiment of the present disclosure.
Figure 1D:
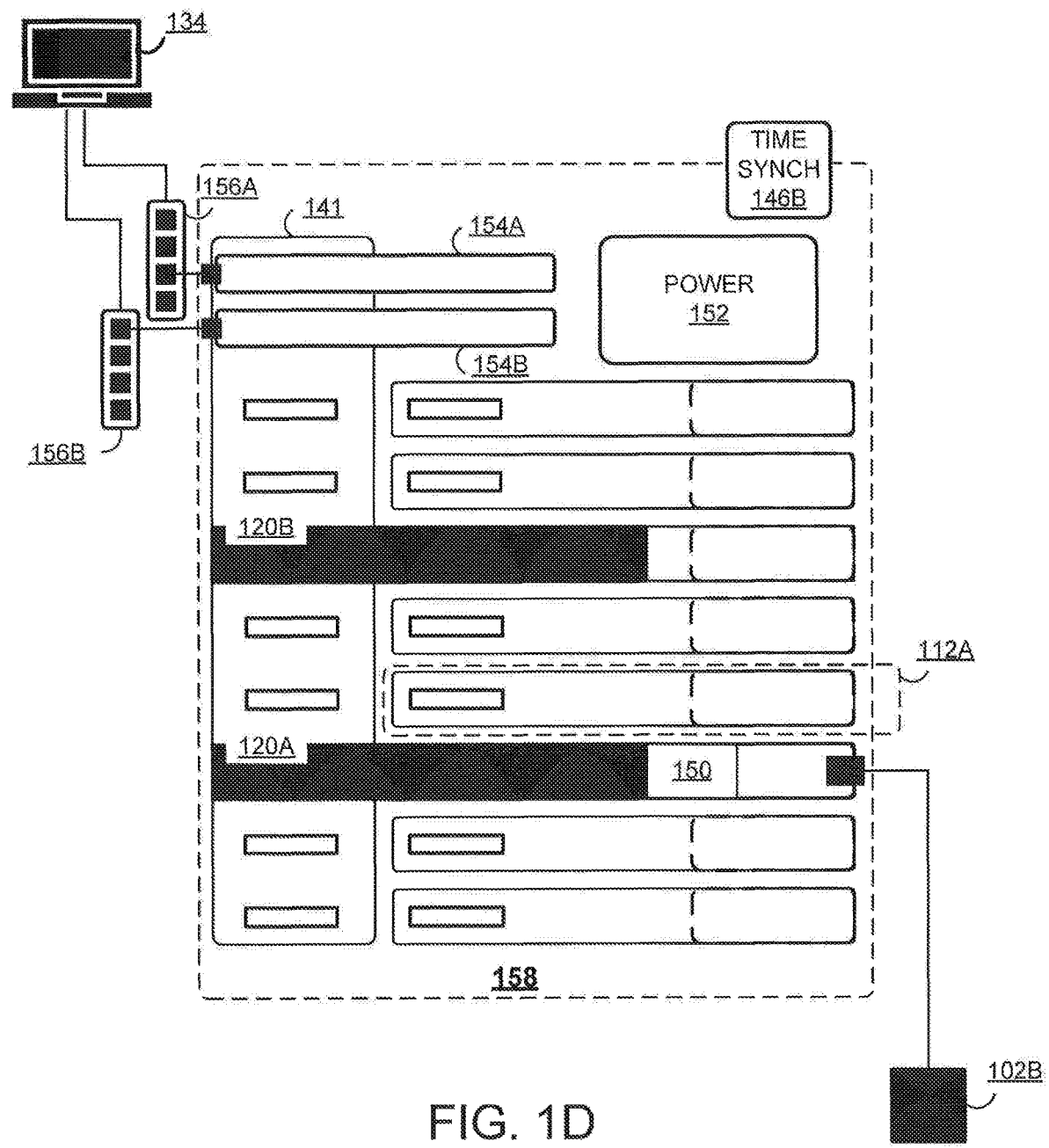
FIG. 1D is a schematic diagram that shows a section view of the scalable, modular I/O module of FIGS. 1B and 1C being engaged at a first slot of the baseplate in accordance with an exemplary embodiment of the present disclosure.

Referring now to FIGS. 1B-1D, in one exemplary embodiment, I/O module 120 (shown in FIG. 1A) can be configured as a Single Signal Input/Output (SSIO) module 120A. SSIO module 120A can include a UIO module 144, an Ethernet/Serial module 148, a control module 142, and/or a time-synch module 146. In one exemplary embodiment, SSIO module 120A can be communicatively coupled, in a point-to-point and/or networked configuration, to single field device 102B and/or multiple field devices (e.g., in a chicken foot, daisy-chain, or other configuration via a field device network switch) at UIO module 144 and/or Ethernet/Serial module 148. The field device 102B can be communicatively coupled via a single field device coupler 112 (e.g., configured as termination assembly (TA) 112A) and/or at a single I/O interface 140B. In an alternative embodiment, SSIO module 120A can be communicatively coupled, in a point-to-point and/or networked configuration, to field devices 102A, 102B at UIO module 144 and/or Ethernet/Serial module 148 via TA 112A at interface 140B and/or at interface 140A. The SSIO module 120A can further be communicatively coupled to, for example, control node 130, network node 134, and/or network 136 via an I/O communication bus 139.

Referring to FIG. 1B, UIO module 144 can be communicatively coupled to a single field device 102B and/or to multiple field devices (e.g., in a chicken foot, daisy-chain, or other configuration via a field device network switch) at an I/O interface 140B of TA 112 via a communication bus. The UIO module 144 can be built to select, receive, output, read, and/or write any data type, signal type, and/or network protocols. For example, UIO module 144 can receive and/or output data and/or signals that include: AI/AO signals, DI/DO signals, digital in/digital out signals, 4-20 Ma in/out+ HART signals, HART in/out signals, FOXCOM in/out signals, pulse signals, NAMUR signals, T/C signals, RTD signals, optical networking signals, etc. UIO module 144 can further read and/write wireless/wired physical layers and/or wireless/wired network protocols that include: MODBUS, Serial, IP, OPC UA, OPC DA, SCADA, IEC 61850, MBMS, CDMA 1×RTT, GSM, UMTS, HSPA, EV-DO, EV-DO rev. A, 3GPP LTE, WiMAX, Ethernet, Fast Ethernet, Gigabit Ethernet, Ethernet/IP, Local Talk, Token Ring, FDDI, ATM, etc. The Ethernet/Serial module 140 can communicatively coupled to a single field device 102A, 102B and/or to multiple field devices (e.g., in a chicken foot, daisy-chain, or other configuration via a field device network switch) at an I/O interface 140B of TA 112 (e.g., directly or through UIO module 144) and/or at I/O interface 140A via a communication bus. The Ethernet/Serial module 148 can be built to select, receive, output, read, and/or write any data type, signal type, and/or network protocols. For example, Ethernet/Serial module 148 can select, read, and/or write physical layers and/or network protocols that include: MODBUS, Serial, IP, OPC UA, OPC DA, SCADA, IEC 61850, MBMS, CDMA 1×RTT, GSM, UMTS, HSPA, EV-DO, EV-DO rev. A, 3GPP LTE, WiMAX, Ethernet, Fast Ethernet, Gigabit Ethernet, Ethernet/IP, Local Talk, Token Ring, FDDI, ATM, etc. Further, UIO module 144 and/or Ethernet Serial module 148 can receive power at an I/O interface 140A, 104B (e.g., using a powered Ethernet network or hub).

Control module 142 can be configured to control communications, control operations, management functions, and/or maintenance functions for communicatively coupled field devices 102A, 102B and/or distributed process control for system 100. Further, control module 142 can detect faults (e.g., of a configured process, the process control system, an asset deployed in a process control environment, etc.) and, on fault detection, can perform diagnostics to identify an abnormal event using, for example, a sequence of events (SoE) report. In addition, control module 142 can be configured to support time-synchronization at, for example, a time-strobe and/or other time-synch control module 146. The time-synch control module 146 can be optionally configured as a redundant control module for high availability. Control module 142, at time-synch control module 146, can receive time updates directly using either an externally maintained optional source of UCT from GPS satellites (or other external, user-selected source) or an internal source using configured software. Alternatively, control module 142, at time-synch control module 146, can receive time-strobe signals (or pulses) from control nodes 130, 132, network node 134, and/or network 136 instructing the control module 142 (e.g., using time-synch control module 146) to synchronize a current time to the updated time. The control module 142 can output time-strobe signals (or pulses) to other SSIO modules 122A-122N, 124, 126 and/or field devices 102, 102A, 102B, 104, 106, 108 (e.g., shown in FIGS. 1A and 1B) instructing the SSIO modules 122A-122N, 124, 126 and/or field devices 102, 102A, 102B, 104, 106, 108 to synchronize a current time to the updated time. On receipt of the output time-strobe signals (or pulses) field devices 102A, 102B, SSIO module 120A, control node 130, network node 134, and/or network 136 can validate a current time and/or the updated time. On validation, the field devices 102A, 102B, SSIO module 120A, control node 130, network node 134, and/or network 136 can "slam" a current time to the updated time, incrementally "step" a current time to the updated time, and/or ignore the instruction to synchronize a current time to the updated time. The time-synch control module 146A can receive, output, read, and/or write data types, signal types, network physical layers and/or network protocols that include: PTP, IEEE 1588, NTP, SNTP, etc.

Referring to FIGS. 1A, 1C and 1D, fault-redundant control nodes 130, 132 can be installed on and/or coupled to a modular, mounting structure 158 (e.g., a DIN rail mounted baseplate) in a dedicated slot that may be keyed for the control node 130, 132 (not shown). Further, I/O modules 120, 122A-122N, 124, 126, 128A-128N and/or SSIO modules 102A, 102B can be installed on and/or coupled to the mounting structure 158, in adjacent slots, at a backbone 141 (e.g., a system backplane configured to connect the installed and/or coupled I/O modules 120, 122A-122N, 124, 126, 128A-128N and/or SSIO modules 102A, 102B together to form a single and/or dual I/O communication bus 135, 137, 139) and/or field device couplers 112, 112A, 114A-114N, 116A-116N, 118 (e.g., configured as TAs that may include coupled field terminations and/or field terminal units and communicate via signal conditioner 150). As noted above, I/O communication buses 135, 137, 139 can communicatively couple I/O modules 120, 122A-122N, 124, 126, 128A-128N, SSIO modules 102A, 1028, and/or field device couplers 112, 112A, 114A-114N, 116A-116N, 118 to control nodes 130, 132. Control nodes 130, 132 can communicatively couple I/O modules 120, 122A-122N, 124, 126, 128A-128N, SSIO modules 102A, 1028, and/or field device couplers 112, 112A, 114A-114N, 116A-116N, 118 via, for example, communication bus bridges 154A, 1548 and/or network switches 156A, 1568 to network node 134 and/or network 136. Alternatively, I/O modules 120, 122A-122N, 124, 126, 128A-128N, SSIO modules 102A, 102B, and/or field device couplers 112, 112A, 114A-114N, 116A-116N, 118 can bypass control nodes 130, 132 and communicate with network node 134 and/or network 136 using physical and/or wireless data links (e.g., via communication bus bridges 154A, 1548, network switches 156A, 1568, and/or directly). The modular, mounting structure 158 can be further configured to support power module 152 (e.g., configured to provide power to 120, 122A-122N, 124, 126, 128A-128N, SSIO modules 102A, 1028, and/or field device couplers 112, 112A, 114A-114N, 116A-116N, 118, which support field devices 102, 102A, 102B, 104, 106, 108, 110A-110N, 111A-111N) and/or time-synchronization at time-synch control module 146B. The time-synch control module 146N can be communicatively coupled to power module 152 and/or to backbone 141.

In an alternative embodiment, I/O modules 120, 122A-122N, 124, 126, 128A-128N and/or SSIO modules 102A, 1028 can be directly installed on and/or coupled to a DIN rail (e.g., not mounted on a baseplate). The DIN rail can be configured to support I/O modules 120, 122A-122N, 124, 126, 128A-128N and/or SSIO modules 102A, 102B. Further, the I/O modules 120, 122A-122N, 124, 126, 128A-128N and/or SSIO modules 102A, 1028 can be powered at an I/O interface 140A, 1408 or port (not shown) using a powered Ethernet network or hub.

Figure 1E:
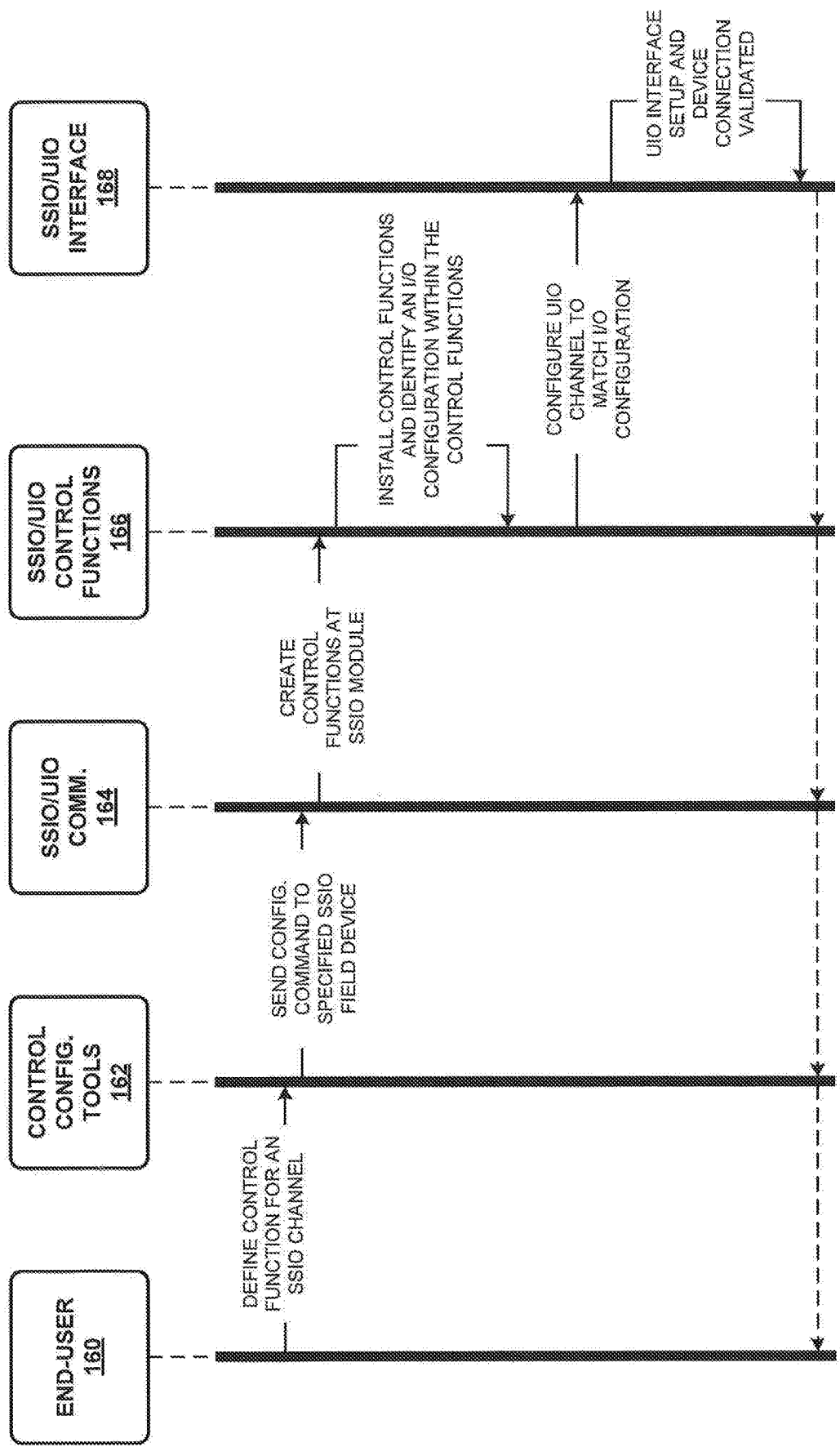
FIG. 1E is a graphical representation depicting a method for enabling process control at a scalable, modular I/O module using the control architecture implemented in FIG. 1A in accordance with an exemplary embodiment of the present disclosure.

Referring now to FIG. 1E, in one exemplary embodiment, at step 160, network 136, network node 134, and/or end-user (e.g., system engineer) can define control information (e.g., control operations, management functions, maintenance functions, historization services, data types, signal types, network protocols, and/or other information) for control nodes 130, 132, SSIO modules 120, 120A, 122A-122N, 124, 126, field device couplers 112, 112A, 114A-114N, 118, and/or field devices 102, 102A, 102B, 104, 106, 108. The defined control information can be installed at, output to, and/or uploaded to a tool configuration module hosted at and/or distributed among the network nodes. Alternatively, network 136 and/or network node 134 can store the defined control information at a tool configuration library and/or instruct the tool configuration module to retrieve stored control information from the tool configuration library. The tool configuration library can be hosted at and/or distributed among the network nodes. At step 162, the tool configuration module can output the captured control information to control nodes 130, 132, SSIO modules 120, 120A, 122A-122N, 124, 126, and/or field device couplers 112, 112A, 114A-114N, 118. At step 164, using the captured control information, control nodes 130, 132, SSIO modules 120, 120A, 122A-122N, 124, 126, and/or field device couplers 112, 112A, 114A-114N, 118 can create (or generate) a control function to identify, detect, and/or select a configuration of a communicatively coupled field device 102, 102A, 1028, 104, 106, 108. The control function may include control logic stored at/in a control execution module (e.g., the control execution module can be configured to use control logic to execute function blocks such as, for example, IEC 61131, IEC 61499, etc., and/or other control logic components). For example, at step 166, control nodes 130, 132, SSIO modules 120, 120A, 122A-122N, 124, 126, and/or field device couplers 112, 112A, 114A-114N, 118 can parse the generated control function to identify, detect, and/or select a data type, signal type, and/or network protocol type (e.g., input type and/or output type) of a communicatively coupled field device 102, 102A, 102B, 104, 106, 108. After identifying, detecting, and/or selecting the input type and/or output type, control nodes 130, 132, SSIO modules 120, 120A, 122A-122N, 124, 126, and/or field device couplers 112, 112A, 114A-114N, 118 can configure an I/O interface 140A, 1408 to receive, output, read, and/or write the input type and/or output type of the communicatively coupled field device 102, 102A, 102B, 104, 106, 108. Further, control nodes 130, 132, SSIO modules 120, 120A, 122A-122N, 124, 126, and/or field device couplers 112, 112A, 114A-114N, 118 can output and/or write the control function to/at the communicatively coupled field device 102, 102A, 1028, 104, 106, 108 using a communication bus. At step 168, control nodes 130, 132, SSIO modules 120, 120A, 122A-122N, 124, 126, field device couplers 112, 112A, 114A-114N, 118, and/or the field device 102, 102A, 1028, 104, 106, 108, on receipt of the control function, can initialize and/or validate an operation at the I/O interface 140A, 1408.

In another exemplary embodiment, at step 160, an end-user can define control information for SSIO modules 120, 120A, 122A-122N, 124, 126, field device couplers 112, 112A, 114A-114N, 118, and/or field devices 102, 102A, 1028, 104, 106, 108. At step 166, the defined control information can be installed, output, and/or uploaded by the end-user to either a tool configuration library hosted at and/or distributed among the SSIO modules 120, 120A, 122A-122N, 124, 126, field device couplers 112, 112A, 114A-114N, 118, and/or field devices 102, 102A, 1028, 104, 106, 108 and/or directly to control module 142. SSIO modules 120, 120A, 122A-122N, 124, 126 and/or field device couplers 112, 112A, 114A-114N, 118 executing (e.g., at a control execution module) the installed, output, and/or uploaded control information can generate a control function. Further, at step 166, SSIO modules 120, 120A, 122A-122N, 124, 126 and/or field device couplers 112, 112A, 114A-114N, 118 can parse the generated control function and use the parsed control function to query (or identify) a data type, signal type, and/or network protocol type of communicatively coupled field devices 102, 102A, 1028, 104, 106, 108. At step 168, using the queried data type, signal type, and/or network protocol type, the SSIO modules 120, 120A, 122A-122N, 124, 126 and/or field device couplers 112, 112A, 114A-114N, 118 can setup a local configuration for the coupled field device 102, 102A, 1028, 104, 106, 108 and share the local configuration with other network nodes.

In yet another embodiment, SSIO modules 120, 120A, 122A-122N, 124, 126 and/or field device couplers 112, 112A, 114A-114N, 118 can discover a communicatively coupled field device 102, 102A, 1028, 104, 106, 108 and query the discovered field device 102, 102A, 102B, 104, 106, 108 (e.g., at a control execution module) for a field device input type and/or output type and, based on the query, can generate a control function. Further, SSIO modules 120, 120A, 122A-122N, 124, 126 and/or field device couplers 112, 112A, 114A-114N, 118 can parse the generated control function and use the parsed control function to setup a local configuration for the coupled field device 102, 102A, 102B, 104, 106, 108 and share the local configuration with other network nodes.

Figure 2:
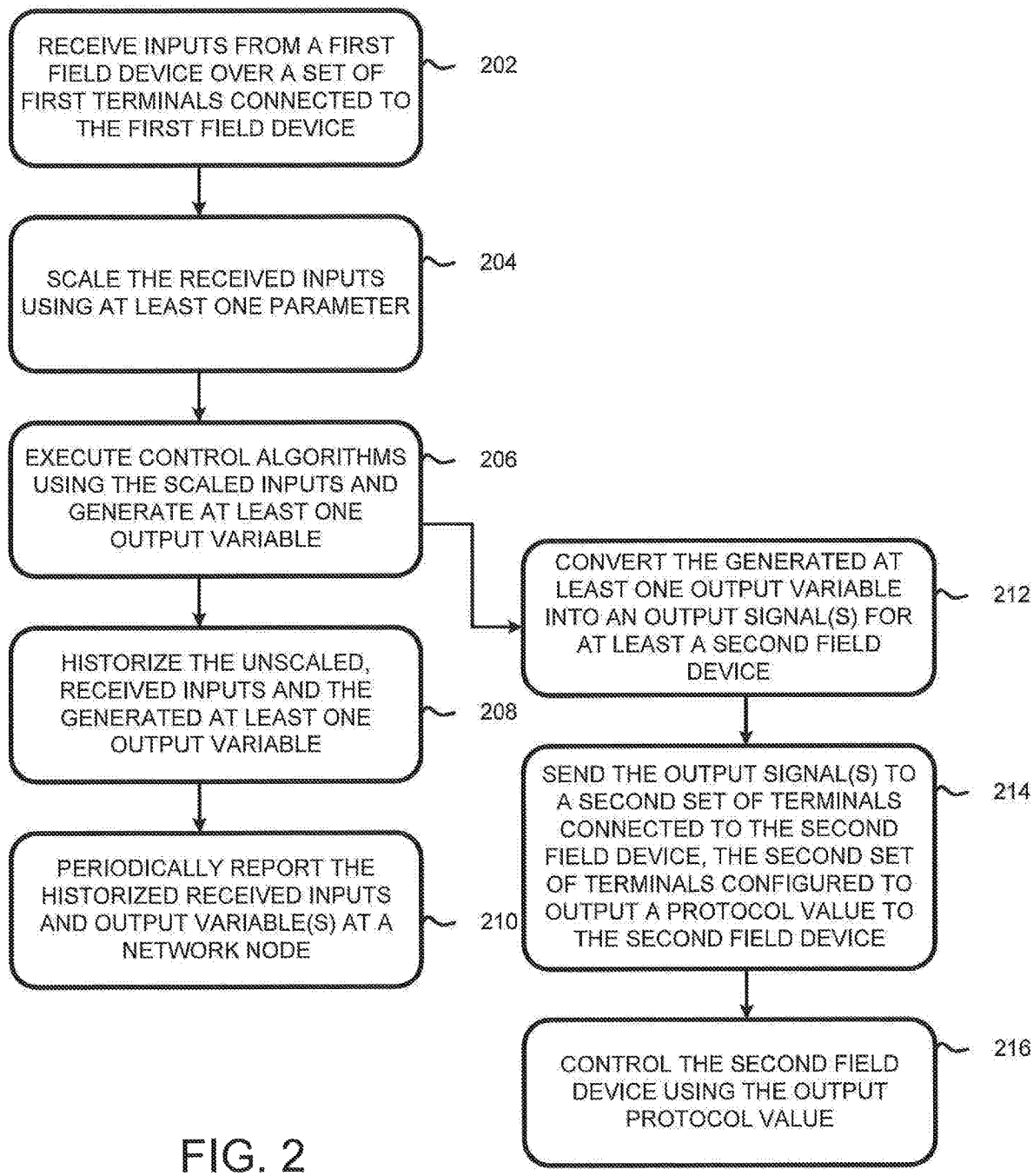
FIG. 2 is a flow diagram depicting a method for enabling process control of field devices coupled at multiple scalable, modular I/O modules using the control architecture implemented in FIG. 1A in accordance with an exemplary embodiment of the present disclosure.

With reference now to FIG. 2, a flow diagram of an exemplary method for enabling process control at a network node is depicted. The method can be implemented in the exemplary process control system 100 shown in FIGS. 1A-1E, or with any suitable control system. The method for enabling process control shown in FIG. 2 is discussed with reference to process control system 100 shown in FIGS. 1A-1E. In addition, while FIG. 2 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At step 202, inputs from a first network node can be received and/or configured at a network node. For example, referring to FIG. 1B, in one exemplary embodiment, a first field device 102A can be communicatively coupled to control node 130, network node 134, and/or network 136 through SSIO module 120A. Field device 102A can output data (e.g., pressure, temperature, flow, level, liquid analytical, valve positioner high-performance measurements, etc.), collected at assets at fixed intervals, to an I/O interface 140A of Ethernet/Serial module 148 of SSIO module 120A using a network protocol such as, for example: MODBUS, Serial, IP, OPC, UA, OPC DA, SCADA, IEC 61850, MBMS, CDMA 1×RTT, GSM, UMTS, HSPA, EV-DO, EV-DO rev. A, 3GPP LTE, WiMAX, Ethernet, Fast Ethernet, Gigabit Ethernet, Ethernet/IP, Local Talk, Token Ring, FDDI, ATM, etc.

At step 204, 206, and 212-216, the inputs from the first network node can be scaled and used to control a second network node. For example, at step 204, Ethernet/Serial module 148 of SSIO module 120A can receive the output data (e.g., inputs) from field device 102A at I/O interface 140A and, in conjunction with control module 142, can scale the inputs using at least one parameter (e.g., SCIX, input type, lag, linearization, noise, normal mode rejection (NMR), output, etc.). At step 206, the control module 142 and/or Ethernet/Serial module 148 can run a control algorithm that uses the scaled inputs to generate a control output. Using the generated control output, control module 142 and/or Ethernet/Serial module 148 can further generate an output variable. The generated output variable can be implemented at control module 142, Ethernet/Serial module 148, and/or I/O module 144 to control operations, management functions, and/or maintenance functions of other field devices 1028. For example, at step 212, control module 142 and/or Ethernet/Serial module 148 can convert the generated output variable into an output signal for at least a second field device 1028. At step 214, control module 142 and/or Ethernet/Serial module 148 can send the converted output signal to, for example, UIO module 144. Control module 142 and/or UIO module 144 can detect an input type of communicatively coupled field device 102B. After identifying the input type, control module 142 and/or UIO module 144 can further convert the output signal to an output type (e.g., using an output protocol value) of field device 102B. UIO module 144 can output the converted output signal to field device 102B. For example, UIO module 144 can output the output signal to the field device 102B (e.g., via field device coupler 112A and/or I/O interface 140B) using, for example, an output signal such as, for example: AI/AO signals, DI/DO signals, digital in/out signals, 4-20 Ma in/out+HART signals, HART in/out signals, FOXCOM in/out signals, pulse signals, NAMUR signals, T/C signals, RTD signals, optical networking signals, etc. At step 214, SSIO module 120A using UIO module 144 can use the output signal to configure output variable values, change process control functions, and/or automate control of field device 1028 to execute control strategies.

At steps 208 and 210, unscaled inputs and/or generated output variables can be historized and/or reported at a network node. For example, at step 208, Ethernet/Serial module 148 of SSIO module 120A can receive the output data (e.g., inputs) from field device 102A at I/O interface 140A and, in conjunction with control module 142, can store (e.g., historize) the unscaled inputs at control module 142 and/or at or among other network nodes and/or in a configuration tool library (not shown). Simultaneously, the control module 142 and/or Ethernet/Serial module 148 can run a control algorithm that uses the scaled inputs to generate control output variables. Ethernet/Serial module 148, in conjunction with control module 142, can store (e.g., historize) the generated control output variables at control module 142 and/or at or among other network nodes and/or in a configuration tool library (not shown). Ethernet/Serial module 148, control module 142, and/or configuration tool library can periodically report the historized unscaled inputs and/or generated control output variables at control nodes 130, 132, network node 134, and/or network 136. The control nodes 130, 132, network node 134, and/or network 136 can use the reports for Sequence of Event (SoE) reporting.

Figure 3:
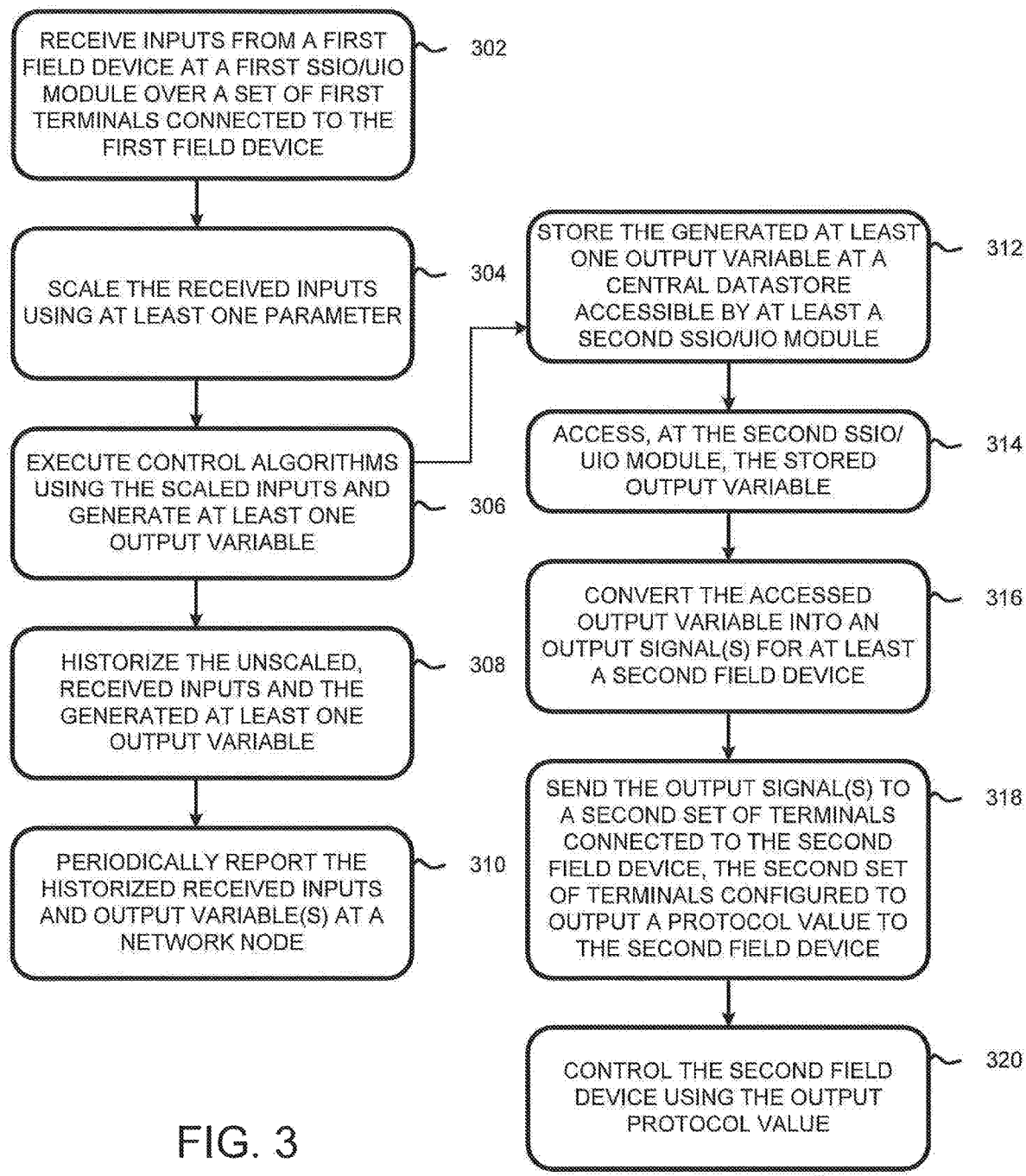
FIG. 3 is flow diagram depicting another method for enabling process control of field devices coupled at multiple scalable, modular I/O modules using the control architecture implemented in FIG. 1A in accordance with an exemplary embodiment of the present disclosure.

With reference now to FIG. 3, a flow diagram of an exemplary method for enabling process control at a network node is depicted. The method can be implemented in the exemplary process control system 100 shown in FIGS. 1A-1E, or with any suitable control system. The method for enabling process control shown in FIG. 3 is discussed with reference to process control system 100 shown in FIGS. 1A-1E. In addition, while FIG. 3 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At step 302, inputs from a first network node can be received and/or configured at a network node. For example, referring to FIGS. 1A and 1B, in one exemplary embodiment, a field device 102A and/or field device 102B can be communicatively coupled to control node 130, network node 134, and/or network 136 through SSIO module 120A. Field devices 102A, 102B can output data (e.g., pressure, temperature, flow, level, liquid analytical, valve positioner high-performance measurements, etc.), collected at assets at fixed intervals, to I/O interfaces 140A, 140B of Ethernet/Serial module 148 and/or UIO module 144 of SSIO module 120A using different data types, signal types, and/or network protocols (e.g., input types).

At steps 304, 306, and 312-320, the inputs from the first network node can be scaled and used to control a second network node. For example, at step 304, Ethernet/Serial module 148 and/or UIO module 144 of SSIO module 120A can receive the output data (e.g., inputs) from field device 102A at I/O interface 140A and/or from field device 102B at I/O interface 140B. Ethernet/Serial module 148, UIO module 144, and/or control module 142 can scale the inputs using at least one parameter (e.g., SCIX, input type, lag, linearization, noise, normal mode rejection (NMR), output, etc.). At step 306, Ethernet/Serial module 148, UIO module 144, and/or control module 142 can run a control algorithm that uses the scaled inputs to generate a control output. Using the generated control output, Ethernet/Serial module 148, UIO module 144, and/or control module 142 can further generate control output variables. At step 312, the generated output variables can be stored (or historized) at a central datastore (e.g., a tool configuration library) hosted at and/or distributed among the network nodes. For example, the tool configuration library could be hosted at control node 130 and/or distributed among SSIO modules 120, 122A-122N, 124, 126 (shown in FIG. 1A); the tool configuration library can be accessed by any network node and/or an end-user. At step 314, SSIO module 124 (shown in FIG. 1A) can retrieve historized control output variables from the tool configuration library. At step 316, SSIO module 124 can implement control output variables retrieved from the tool configuration library to control operations, management functions, and/or maintenance functions of communicatively coupled field device 118. For example, SSIO module 124 can convert the control output variables into an output signal for coupled field device 118. At step 318, the SSIO module 124 (e.g., at an Ethernet/Serial module, UIO module, and/or control module) can detect an input type of the communicatively coupled field device 1028 and, after identifying the input type, can further convert the output signal to an output type (e.g., using an output protocol value) of field device 118. SSIO module 124 can output the converted output signal to coupled field device 118 using, for example, an output signal such as, for example: AI/AO signals, DI/DO signals, digital in/out signals, 4-20 Ma in/out+HART signals, HART in/out signals, FOXCOM in/out signals, pulse signals, NAMUR signals, T/C signals, RTD signals, optical networking signals, etc. Alternatively, SSIO module 124 can output the converted output signal to coupled field device 118 using, for example, a network protocol such as, for example: MODBUS, Serial, IP, OPC, UA, OPC DA, SCADA, IEC 61850, MBMS, CDMA 1×RTT, GSM, UMTS, HSPA, EV-DO, EV-DO rev. A, 3GPP LTE, WiMAX, Ethernet, Fast Ethernet, Gigabit Ethernet, Ethernet/IP, Local Talk, Token Ring, FDDI, ATM, etc. At step 320, SSIO module 124 can use the output signal to configure output variable values, change process control functions, and/or automate control of field device 118 to execute control strategies.

At steps 308 and 310, unscaled inputs and/or generated output variables can be historized and/or reported at a network node. For example, at step 208, Ethernet/Serial module 148, UIO 144, and/or control module 142 of SSIO module 120A can receive the output data (e.g., inputs) from field device 102A at I/O interface 140A and/or from field device 102B at I/O interface 140B. SSIO module 120A can store (e.g., historize) the unscaled inputs at control module 142 and/or at or among other network nodes and/or in the configuration tool library. Simultaneously, Ethernet/Serial module 148, UIO 144, and/or control module 142 can run a control algorithm that uses the scaled inputs to generate control output variables. SSIO module 120A can store (e.g., historize) the generated control output variables at control module 142 and/or at or among other network nodes and/or in the configuration tool library. SSIO module 120 and/or the configuration tool library can periodically report the historized unscaled inputs and/or generated control output variables at, for example, control nodes 130, 132, network node 134, and/or network 136. The control nodes 130, 132, network node 134, and/or network 136 can use the reports for SoE.

Figure 4A:
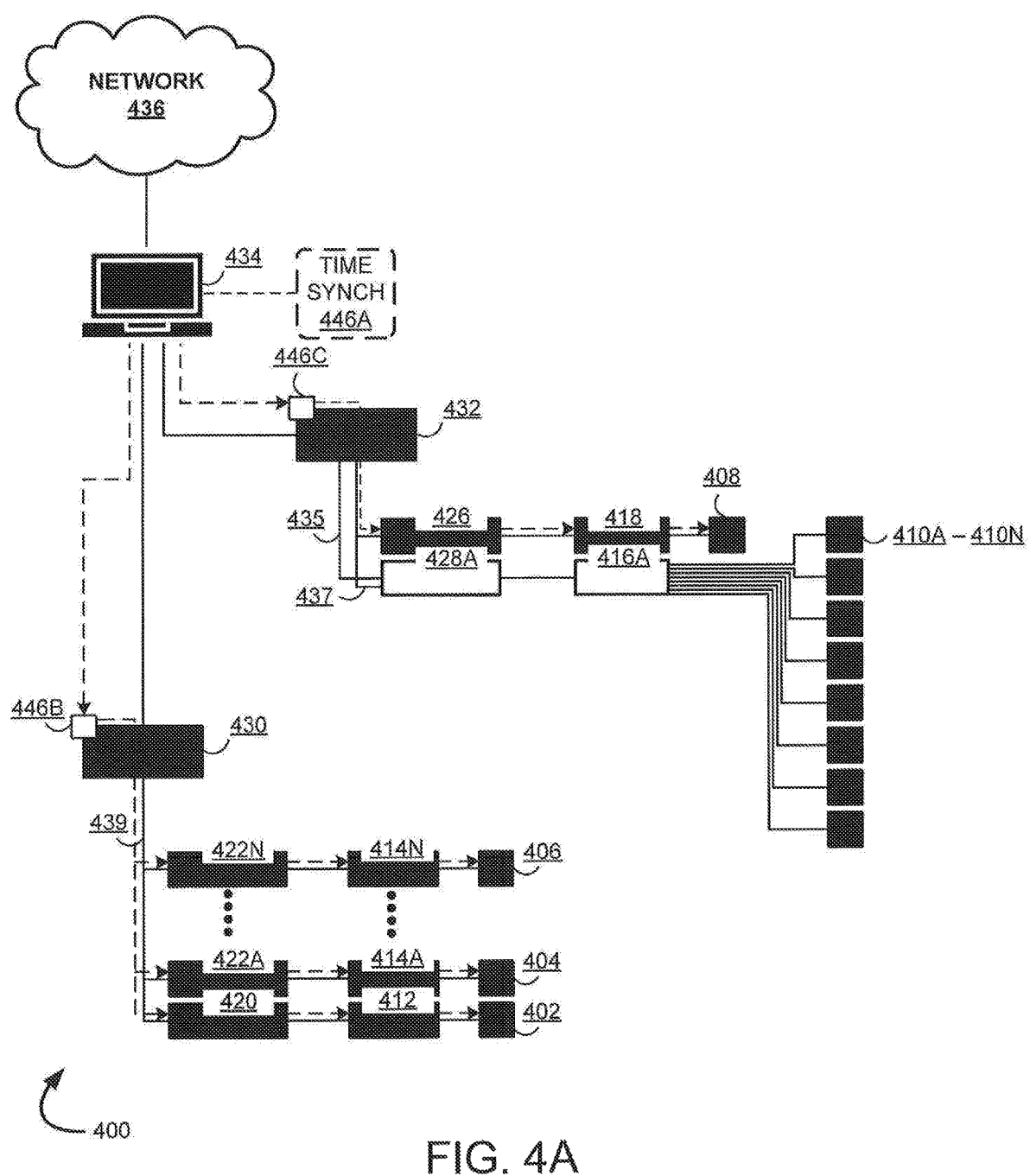
FIG. 4A is a schematic view of an exemplary process control system configured to implement the scalable, modular control architecture of FIG. 1A and a time-strobe synch in accordance with an exemplary embodiment of the present disclosure.
Figure 4B:
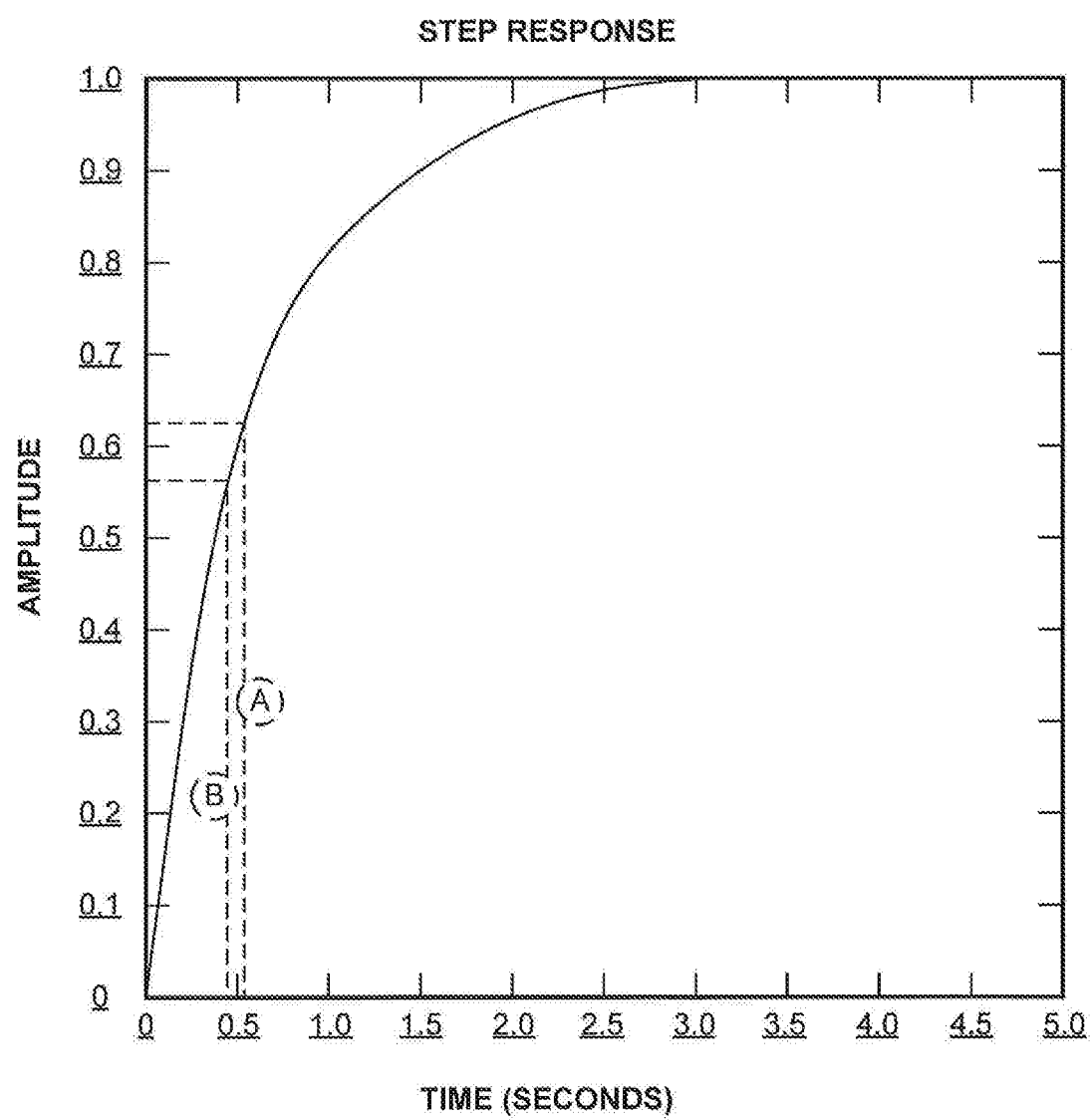
FIG. 4B is a graphical representation depicting the time-strobe synch implemented in FIG. 4A and an associated process control response-time to set-point change for a control loop in accordance with an exemplary embodiment of the present disclosure.
Figure 4C:
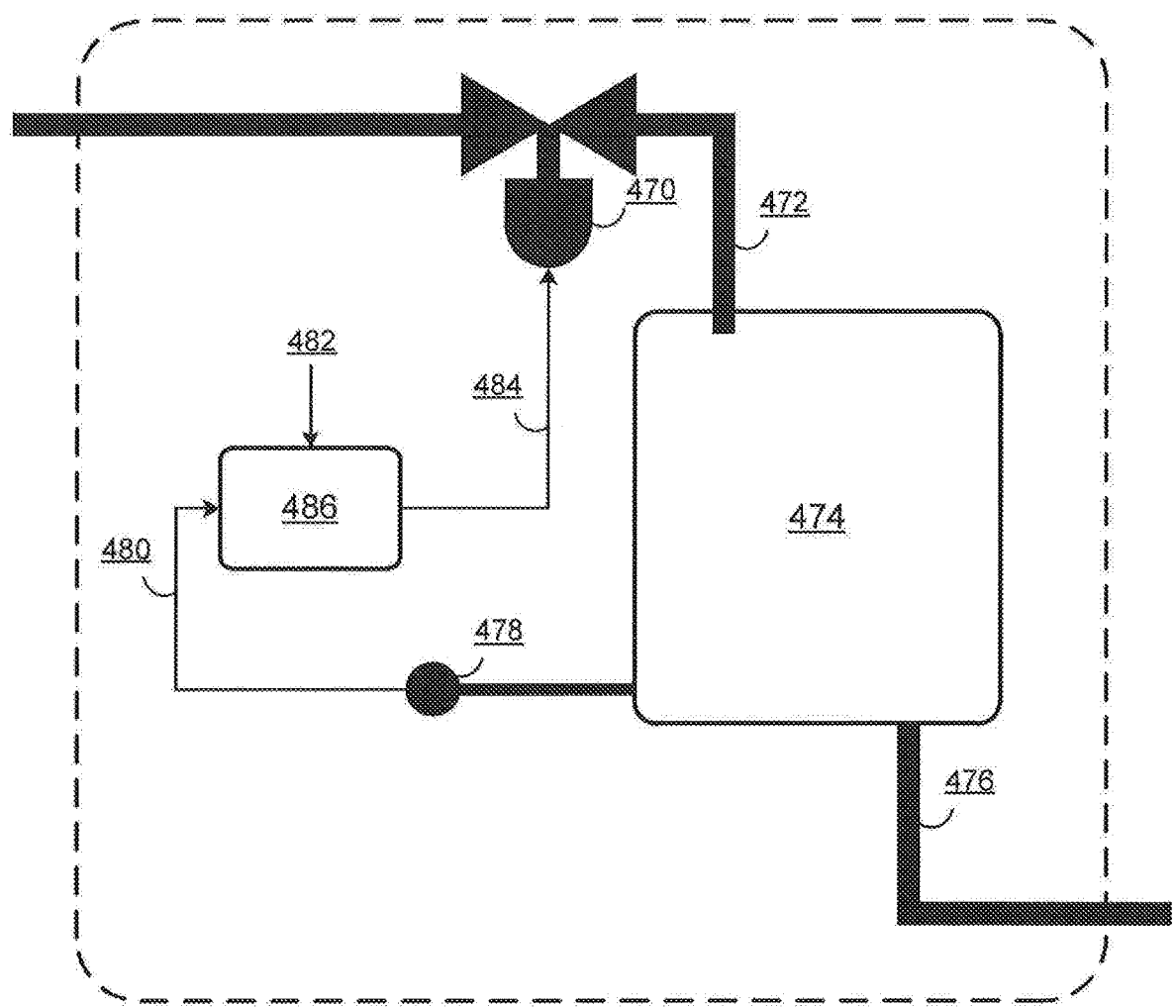
FIG. 4C is a schematic diagram that shows the scalable, modular control architecture of FIGS. 1A and 4A implemented at an asset in accordance with an exemplary embodiment of the present disclosure.

With reference now to FIGS. 4A-4C, a schematic view and graphical representations of an exemplary process control system 400 are depicted. System 400 can include field devices 402, 404, 406, 408, 410A-410N (e.g., temperature, flow, level and pressure transmitters, smart valves, actuators, etc.) communicatively coupled to network 436, network node 434, and/or control nodes 430, 432 through SSIO modules 420, 422A-422N, 418 or Foundation FieldBus module (FBM) 428A using, for example, I/O communication buses 435, 437, 439. Separate communication buses (e.g., a wire, a cable, a circuit, an optical fiber, a wireless signal, a network protocol, etc.) connect the field devices 402, 404, 406, 408, 410A-410N via field device couplers 412, 414A-414N, 416A, 418. System 400 can further include time-synch modules 446A, 446B, 446C.

Time-synch modules 446A, 446B, 446C can be hosted at and/or distributed among field devices 402, 404, 406, 408, 410A-410N, field device couplers 412, 414A-414N, 416A, 418, SSIO modules 420, 422A-422N, 426, FBM 428A, control nodes 430, 432, network node 434, and/or network 436. Time-synch modules 446A, 446B, 446C can be configured to support time-synchronization and can receive and/or output time updates. For example, time-synch modules 446A, 446B, 446C can receive time updates directly using either an externally maintained optional source of UTC from GPS satellites (or other external, user-selected source) or an internal source using configured software. Alternatively, time-synch modules 446A, 446B, 446C can receive and/or output time-strobe signals (or pulses) to/from other time-synch modules 446A, 446B, 446C; the time-strobe signals (or pulses) instruct the time-synch modules 446A, 446B, 446C to synchronize a current time to the updated time. Further, time-synch modules 446A, 446B, 446C can output time-strobe signals (or pulses) field devices 402, 404, 406, 408, 410A-410N, field device couplers 412, 414A-414N, 416A, 418, SSIO modules 420, 422A-422N, 426, FBM 428A, control nodes 430, 432, network node 434, and/or network 436 instructing the field devices 402, 404, 406, 408, 410A-410N, field device couplers 412, 414A-414N, 416A, 418, SSIO modules 420, 422A-422N, 426, FBM 428A, control nodes 430, 432, network node 434, and/or network 436 to synchronize a current time to an updated time. Time-synch modules 446A, 446B, 446C can receive, output, read, and/or write data types, signal types, physical layers, and/or network protocols that include: PTP, IEEE 1588, GPS, NTP, SNTP, etc. Time-synch modules 446A, 446B, 446C can collect SoE and/or TDR/TDA reports.

Figure 5:
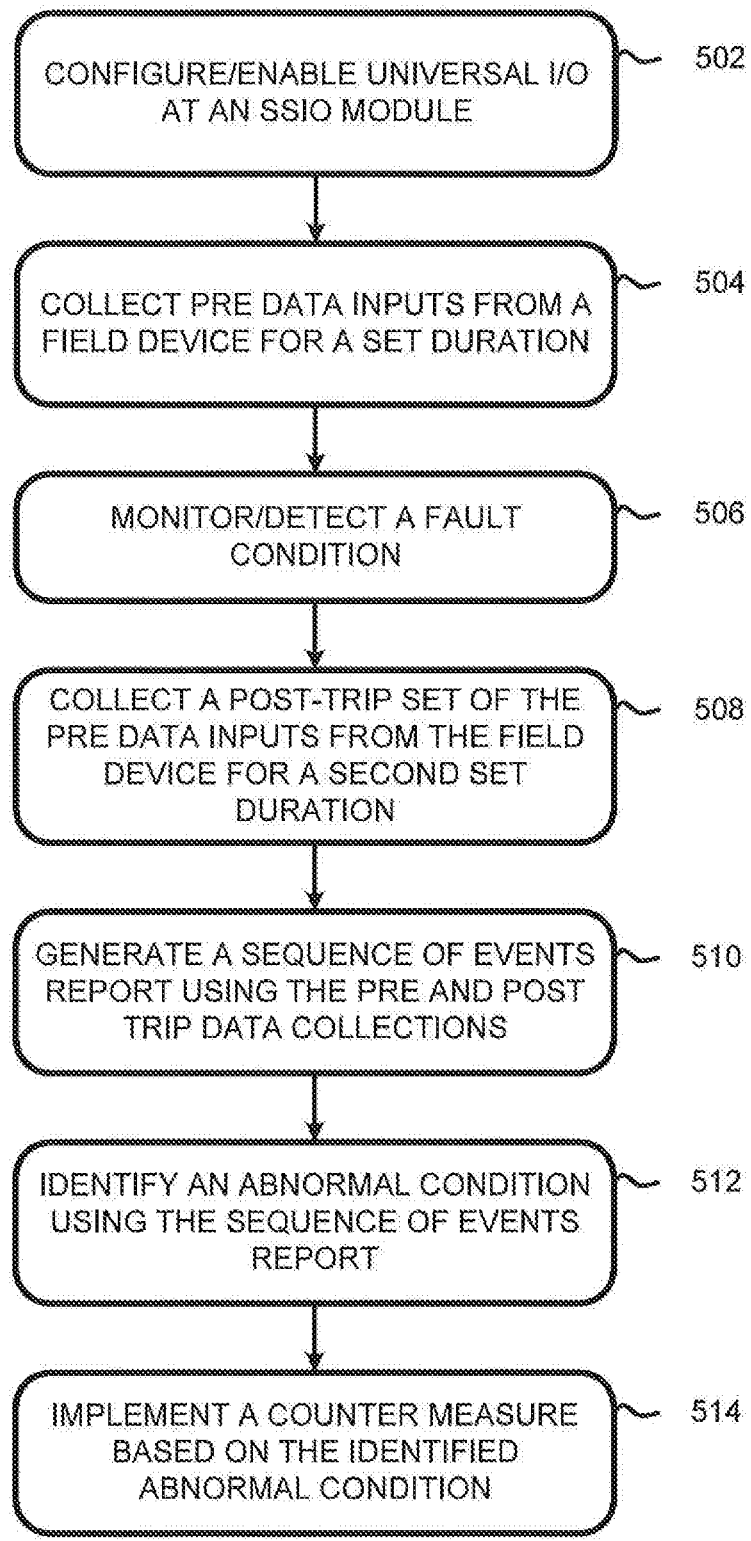
FIG. 5 is a flow diagram depicting a method for detecting, at a network node, an abnormal condition using the scalable, modular control architecture of FIGS. 1A and 4A in accordance with an exemplary embodiment of the present disclosure.

With reference now to FIG. 5, a flow diagram of an exemplary method for detecting an abnormal condition using a scalable, modular control architecture is depicted. The method can be implemented in the exemplary process control system 100 shown in FIGS. 1A-1E, in the exemplary process control system 400 shown in FIGS. 4A-4C, or with any suitable control system. The method for detecting an abnormal condition shown in FIG. 5 is discussed with reference to process control system 100 shown in FIGS. 1A-1E and with reference to process control system 400 shown in FIGS. 4A-4C. In addition, while FIG. 5 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At step 502, a UIO module can be enabled at a network node. For example, referring to FIGS. 1B and 4A, in one exemplary embodiment, SSIO module 420 can be configured as an SSIO/UIO module. SSIO/UIO module 420 can be communicatively coupled to field device 402, in a point-to-point and/or networked configuration. The SSIO/UIO module 420 can further be communicatively coupled to, for example, control node 430, network node 434, and/or network 436 via an I/O communication bus 139. SSIO/UIO module 420 can include a UIO module 144, an Ethernet/Serial module 148, a control module 142, and/or a time-synch module 146 (shown in FIG. 1B). Alternatively, the time-synch module 446A, 446B, 446C can be hosted at and/or distributed among other network nodes. UIO module 144 and/or Ethernet/Serial module 148 can be optionally enabled, disabled, and/or connected to a network switch.

At steps 504 and 506, a network node can be monitored for a fault condition. Referring to FIGS. 1B and 4A, in one exemplary embodiment, control module 142 can enable (or trigger) SoE and/or TDR/TDA reporting at SSIO/UIO module 420 if, for example, a condition of a control process, process control system 400, and/or an asset deployed within a process control environment meets a set criteria and/or exceeds a threshold. For example, SoE reports can include SoE output data (e.g., discrete data outputs from field device 402, time-stamped at fixed time-intervals at SSIO/UIO module 402) and TDR/TDA reports can include TDR/TDA output data (e.g., analog or digital data outputs from field device 402, time-stamped at fixed time-intervals at SSIO/UIO module 402). The SoE reports and/or TDR/TDA reports can be sent to control nodes 430, 432, network node 434, and/or network 436. At 504, field device 402 can be communicatively coupled to SSIO/UIO module 420 at the UIO module 144 and/or Ethernet/Serial module 148. Field device 402 can be configured to output data (e.g., pressure, temperature, flow, level, liquid analytical, valve positioner high-performance measurements, etc.) collected from assets (not shown) at fixed time-intervals (e.g., "pre-data" inputs). The pre-data inputs can be time-stamped using, for example, time-synch module 146, and reported by field device 402 at UIO module 144, Ethernet/Serial module 148, and/or control module 142 in pre-data SoE and/or TDR/TDA reports. At step 506, at SSIO/UIO module 420, the control module 142 can collect, store, and/or monitor the pre-data SoE and/or TDR/TDA reports from field device 402 for a first set duration. The first set duration can correspond to a first pre-configured time window before the control module 142 of SSIO/UIO module 420 detects a fault-condition.

At step 508, a post-trip set of the pre-data inputs can be collected at a network node. For example, referring to FIGS. 1B and 4A, on detection of a fault condition at step 506, control module 142 can instruct field device to capture and/or output data from assets (not shown) at fixed time-intervals (e.g., "post-trip set" of pre-data inputs). The post-trip set of pre-data inputs can be time-stamped using, for example, time-synch module 146, and reported by field device 402 at UIO module 144, Ethernet/Serial module 148, and/or control module 142 in a post-trip set of SoE and/or TDR/TDA reports. At SSIO/UIO module 420, the control module 142 can collect, store, and/or monitor the post-trip set of SoE and/or TDR/TDA reports from field device 402 for a second set duration. The second set duration can correspond to a second pre-configured time window after the control module 142 of SSIO/UIO module 420 detects a fault-condition.

At steps 510-512, a network node can generate an updated SoE and/or TDR/TDA report using the pre-trip data inputs and/or the post-trip set of pre-data inputs. For example, at step 510, control module 142 can collect and/or combine the pre-trip set of SoE and/or TDR/TDA reports and the post-trip set of SoE and/or TDR/TDA reports. Using the collected and/or combined pre/post-trip sets of SoE and/or TDR/TDA reports, the control module 142 can generate an updated SoE and/or TDR/TDA report. At step 512, the control module 142 and/or an end-user can identify (or detect) an abnormal condition of, for example, a control process, process control system 400, and/or an asset deployed within a process control environment using the updated SoE and/or TDR/TDA report. At step 514, the control module 142 can implement a counter-measure based on the identified normal condition.

Figure 6:
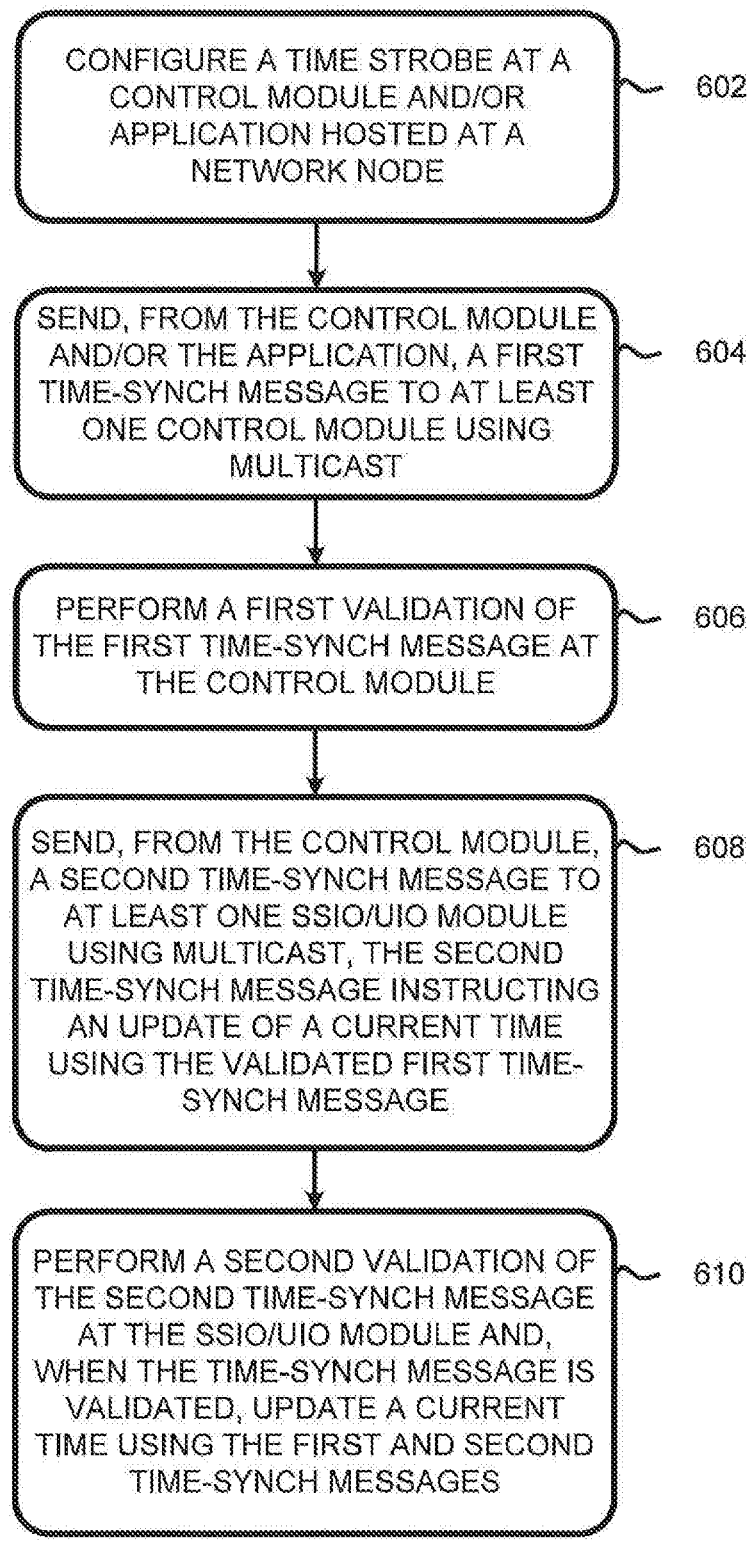
FIG. 6 is another flow diagram depicting a method for configuring, at a network node, a time-strobe synch using the scalable, modular control architecture of FIGS. 1A and 4A in accordance with an exemplary embodiment of the present disclosure.

With reference now to FIG. 6, a flow diagram of an exemplary method for configuring, at a network node, a time-strobe synch using a scalable, modular control architecture is depicted. The method can be implemented in the exemplary process control system 100 shown in FIGS. 1A-1E, in the exemplary process control system 400 shown in FIGS. 4A-4C, or with any suitable control system. The method for configuring the time-strobe synch shown in FIG. 6 is discussed with reference to process control system 100 shown in FIGS. 1A-1E and with reference to process control system 400 shown in FIGS. 4A-4C. In addition, while FIG. 6 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At steps 602 and 604, a time-strobe can be configured at a control module and/or application hosted at a network node. For example, referring to FIGS. 1B, 1D, and 4A, a master time-synch module 446A hosted at, for example, a control module (not shown) of network node 434 can support time-synchronization. Master time-synch module 446A can be configured in a master-slave relationship with other master-slave time-synch modules configured in different hierarchical layers at, for example, control nodes 430, 432, SSIO/UIO modules 420, 422A-422N, 426, FBM module 428, field device couplers 412, 414A-414N, 416A, 418, and/or field devices 402, 404, 406, 408, 410A-410N. In one exemplary embodiment, master time-synch module 446A can receive time updates directly using either an externally maintained optional source of UTC from GPS satellites or an internal source using configured software. The master time-synch module 446A can output time-strobe signals (or pulses or other haptic, tactile, and/or visual feedback) to master-slave time-synch modules 446B, 446C configured at, for example, control nodes 430, 432 using a first multicast message (e.g., MBMS protocol). The first multicast message can instruct master-slave time-synch modules 446B, 446C to synchronize a current time to the updated time (e.g., the updated time at master time-strobe 446A at the pulse is 4:01 p.m.).

At step 606, before synchronizing a current time to the updated time, master-slave time-synch modules 446B, 446C can perform a first validation of the first multicast message at control nodes 430, 432. If the first multicast message is valid at step 606, the control nodes 430, 432 can synchronize a current time to the updated time by "slamming" and/or "incrementally stepping" a current time to the updated time. Alternatively, the control nodes 430, 432 can ignore the multicast message.

At step 608, if the first multicast message is valid at step 606, master-slave time-synch modules 446B, 446C can output time-strobe signals (or pulses or other haptic, tactile, and/or visual feedback) to master-slave time-synch modules 146A configured at, for example, SSIO/UIO modules 420, 422A-422N, 426, FBM module 428A, field device couplers 412, 414A-414N, 416A, 418, and/or field devices 402, 404, 406, 408, 410A-410N using a second multicast message (e.g., MBMS protocol). The second multicast message can include the first multicast message and instruct master-slave time-synch modules 146A configured at SSIO/UIO modules 420, 422A-422N, 426, FBM module 428A, field device couplers 412, 414A-414N, 416A, 418, and/or field devices 402, 404, 406, 408, 410A-410N to synchronize a current time to the validated updated time (e.g., the updated time at master time-strobe 446A at the pulse is 4:01 p.m.).

At step 610, before synchronizing a current time to the updated time, master-slave time-synch modules 146A configured at SSIO/UIO modules 420, 422A-422N, 426, FBM module 428A, field device couplers 412, 414A-414N, 416A, 418, and/or field devices 402, 404, 406, 408, 410A-410N can perform a second validation of the first multicast message and/or a first validation of the second multicast message at a control module 142. If the first multicast message and/or the second multicast message is valid at step 610, the control module 142 can synchronize a current time to the updated time by "slamming" and/or "incrementally stepping" a current time to the updated time. Alternatively, the control module 142 can ignore the first multicast message and/or the second multicast message.

In one example, referring to FIGS. 4B and 4C, an example of process control is depicted. For example, in one exemplary embodiment, a closed loop collects a measurement 480 of a current fluid level at fluid tank 474 using Level Transmitter (LT) 478. A tank level controller 486 can implement a PID control algorithm. The PID control algorithm uses three separate components to effectively provide control: Proportional control, Integral control, and Derivative control. Each of these three components influence the algorithm output using a control error (e.g., a difference between a measurement 480 and a desired tank level set point 482). The algorithm output 484 may be sent to a control valve 470 to open and/or close the control valve 470 to achieve the desired set point 482. Using proportional control only, the tank level controller 486 stabilizes at an output value 484 that leaves an offset between the measurement 480 and tank level set point 482. For example, if a tank level setpoint 482 is set at 4.0 feet, using proportional control only, the tank level may stabilize at 3.75 feet. To compensate for this offset, Integral control can be used. For example, Integral control can be used to continuously adjust an output value 484 until the offset has been eliminated and the measurement 480 and the desired tank level set point 482 exactly match. Further, Derivative control can be added to Integral control to cause control response time to a set point change to increase. Integral and Derivative terms use sample interval time.

Often, to control algorithms (e.g., PID, MPC, etc.), inaccurate time values may be interpreted as noisy process measurement data. FIG. 4B shows an exemplary first order process response curve to a step-change. In one exemplary embodiment, control nodes 430, 432, SSIO/UIO modules 420, 422A-422N, 426, FBM module 428A, field device couplers 412, 414A-414N, 416A, 418, and/or field devices 402, 404, 406, 408, 410A-410N may implement a control algorithm requiring measurements at fixed time-intervals such as, for example, every 0.5 seconds. Because 0.5 seconds has a true value of approximately 0.63 seconds (A), if the required measurement was actually taken at 0.4 seconds (B), then an actual value of 0.55 is provided to the control algorithm. The effect of inaccurate time values on control performance can be dependent on the control algorithm, implementation of the control algorithm, and/or the control process. For example, FIG. 4B shows the integral and derivative actions of a generic PID algorithm. The integral and/or derivative actions PID algorithms at a particular time-instant is shown below. Here, $T_S$ is a block execution time, $\epsilon$ is a random variance, f is a process response, $t_s$ is a time index, $K_I$ is an integral gain, and $K_D$ is a derivative gain.

$$0.5 \times K_I (f(t_s+\epsilon)+f(t_{s+1}+\epsilon))T_s \quad (1)$$

$$K_D(f(t_{s+1}+\epsilon)-f(t_s+\epsilon))T_S^{-1} \quad (2)$$

If the function is a first order process, $$f(t) = Ke^{\frac{-t}{\tau}},$$

where $\tau$ is the process time constant, the sensitivity of the output of the PID algorithm to variance in the time value can be determined by differentiating each term with respect to the variance. Below, are values of the derivative integral and derivative terms of the PID algorithm:

$$\frac{0.5 \times K_I \times K \times \left(e^{\frac{-(t_i+\epsilon)}{\tau}} + e^{\frac{-(t_{i+1}+\epsilon)}{\tau}}\right)T_S}{\tau} \quad (3)$$

$$\frac{K_D \times K \times \left(e^{\frac{-(t_{i+1}+\epsilon)}{\tau}} - e^{\frac{-(t_i+\epsilon)}{\tau}}\right)}{\tau \times T_S} \quad (4)$$

As shown above, both integral and derivative terms are most sensitive to errors in time values when the process time constant, $\tau$, is small and gains are large. In other words, the integral and derivative terms are most sensitive to control nodes and/or modules that are tightly tune. Additionally, when the function block execution and/or process loop control time is large, the integral action is more sensitive to time value errors. Conversely, the derivative action is less sensitive. Further, when the function block execution and/or process loop control time is small, integral action is less sensitive to time value errors, while derivative action is more sensitive. The equations provided indicate the importance of time in the controller algorithms. Control performance can be improved if the correct sample time values are used for the controller output calculations. The control algorithms can utilize the correct time values and compensate for any variations with the expected sample periods. The correct sample time values are only available if the time is synchronized between the control nodes, which share control and I/O data. In highly-distributed control systems, accurate time-stamp information becomes increasingly important. To achieve this accuracy, time synchronization between, for example, control nodes 430, 432, SSIO/UIO modules 420, 422A-422N, 426, 428A, field device couplers 412, 414A-414N, 416A, 418, and/or field devices 402, 404, 406, 408, 410A-410N is critical.

Figure 7:
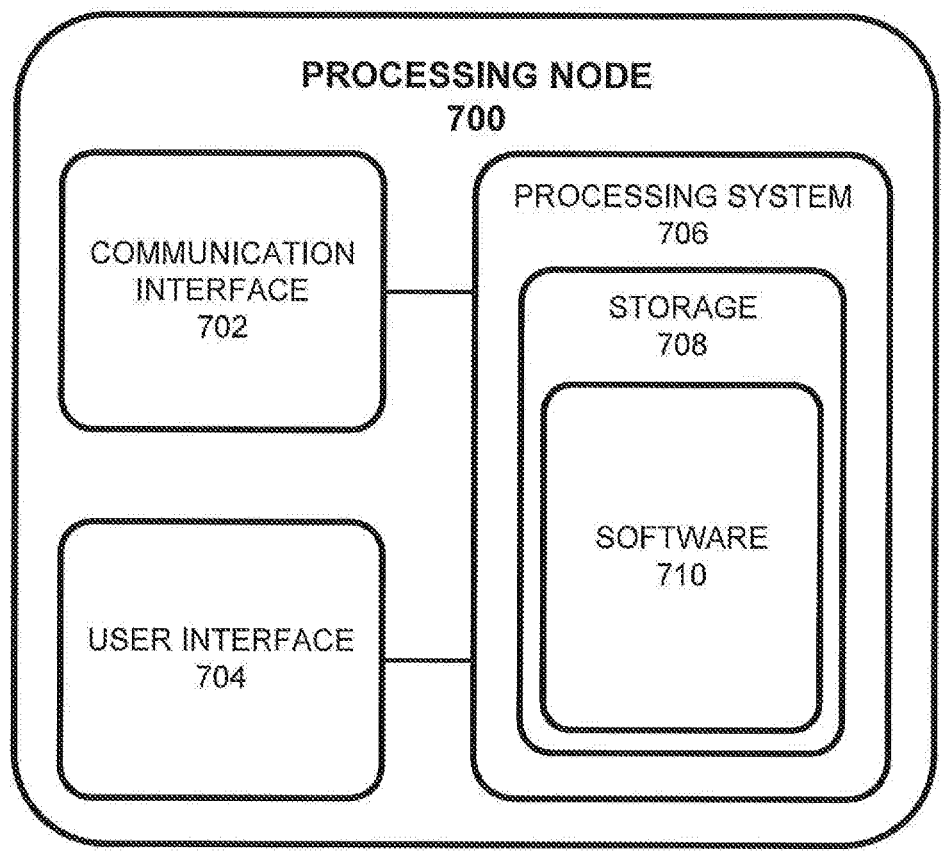
FIG. 7 depicts an exemplary processing node.

FIG. 7 shows an exemplary processing node 700 in a network system. Processing node 700 can include a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710, which is used in the operation of processing node 700. Storage 708 includes a disk drive, flash drive, data storage circuitry, or some other memory apparatus. Software 710 can include computer programs, firmware, or some other form of machine-readable instructions, including an operating system, utilities, drivers, network interfaces, applications, or some other type of software. Processing system 706 can include a microprocessor and other circuitry to retrieve and execute software 710 from storage 708. Processing node 700 can further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 can include network nodes 134, 434, control nodes 130, 132, 430, 432, control module 142, I/O modules 120, 122A-122N, 124, 126, 128A-128N, 420, 422A-422N, 426, 428, device couplers 112, 112A, 114A-114N, 116A-116N, 118, 412, 414A-414N, 416A, 418, field devices 102, 104, 106, 108, 110A-110N, 402, 404, 406, 408, 410A-410N, UIO module 144, Ethernet/Serial module 148, and/or time-synch modules 146A, 146B, 446A, 446B, 446C. Processing node 700 can also be a component of a network element, such as a component of network nodes 134, 434, control nodes 130, 132, 430, 432, control module 142, I/O modules 120, 122A-122N, 124, 126, 128A-128N, 420, 422A-422N, 426, 428, device couplers 112, 112A, 114A-114N, 116A-116N, 118, 412, 414A-414N, 416A, 418, field devices 102, 104, 106, 108, 110A-110N, 402, 404, 406, 408, 410A-410N, UIO module 144, Ethernet/Serial module 148, and/or time-synch modules 146A, 146B, 446A, 446B, 446C. Processing node 700 can also be another network element in a network system. Further, the functionality of processing node 700 can be distributed over multiple network elements of the network system.

The exemplary methods and systems described can be performed under the control of a processing system executing computer-readable codes embodied on a computer-readable recording medium or signals sent through a transitory medium. The computer-readable recording medium can be any data storage device that can store data readable by a processing system and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The signals transmitted through a transitory medium may include, for example, modulated signals transmitted through wired or wireless transmission paths.

Other embodiments of the invention will be apparent to those skilled in the art from consideration of the specification and practice of the present disclosure and claims herein. It is intended that the specification and examples be considered as exemplary only, with a scope being indicated by the claims, including equivalents.

What is claimed is:

1. A modular network node, the network node comprising:
a control module;
a first module coupled to the control module, the first module being configured to select either a first input type, a first output type, or both, of a first field device coupled at a first input/output (I/O) interface of the modular network node; and
a second module coupled to the control module, the second module being configured to select either a second input type, a second output type, or both, of the first field device coupled at the first I/O interface of the modular network node,
wherein the first module, the second module, or both, are coupled to the first I/O interface through a first field device coupler.

2. The modular network node of claim 1, wherein the modular network node is configured as a Single Signal Input/Output (SSIO) module.

3. The modular network node of claim 2, wherein the first module is configured as a Universal Input/Output (UIO) module and the second module is configured as an Ethernet/Serial module.

4. The modular network node of claim 3, wherein either the first input type, the first output type, or both, is a signal that includes at least one of: analog input/output (AI/AO) signals, discrete input/output (DI/DO) signals, digital in/digital out signals, 4-20 milliamp in/out+Highway Addressable Remote Transducer (HART) signals, HART in/out signals, Foxcom in/out signals, pulse signals, Standardization Association for Measurement and Control (NAMUR) signals, thermocouple (T/C) signals, Resistance Temperature Detector (RTD) signals, or optical networking signals.

5. The modular network node of claim 3, wherein the second input type, the second output type, or both, is a physical layer, a network protocol, or both, that includes at least one of: Modbus, Serial, Internet Protocol (IP), Open Platform Communications (OPC) Unified Architecture (UA), OPC Data Access (DA), Supervisory Control and Data Acquisition (SCADA), International Electrotechnical Commission (IEC) 61850, or Ethernet/IP.

6. The modular network node of claim 1, wherein the field device coupler is configured as a termination assembly (TA), the TA being configured to:
communicate with the first module and the second module of the modular network node using a signal conditioner; and
couple the modular network node at a first slot of a mounting structure.

7. The modular network node of claim 6, wherein the TA includes a field termination and a field terminal unit.

8. The modular network node of claim 1, wherein the control module is configured to:
generate a control function for the first module and the second module, the control function being generated using control logic stored at a control execution module;
parse the generated control function; and
query the first field device using the parsed control function.

9. The modular network node of claim 8, wherein the control module is further configured to:
configure the first I/O interface using the query; and
output the generated control function to the first field device.

10. The modular network of claim 9, wherein the first field device, on receipt of the generated control function, is configured to:
initialize an operation; and
validate the initialized operation.

11. The modular network of claim 1, wherein the second module includes a second I/O interface, the second I/O interface configured to receive a power input, a second field device, or both.

\* \* \* \* \*